United States Patent
Naylor

(10) Patent No.: US 7,232,244 B2
(45) Date of Patent: Jun. 19, 2007

(54) VEHICLE SAFETY WARNING SIGNAL DEVICES AND SYSTEM FOR USE ON A BICYCLE, MOTORCYCLE OR LIKE VEHICLE

(75) Inventor: Dennis Naylor, Leeds (GB)

(73) Assignee: David Smith (GB)

( * ) Notice: Subject to any disclaimer, the term of this patent is extended or adjusted under 35 U.S.C. 154(b) by 0 days.

(21) Appl. No.: 10/549,021

(22) PCT Filed: Oct. 24, 2003

(86) PCT No.: PCT/GB03/04619

§ 371 (c)(1),
(2), (4) Date: Sep. 15, 2005

(87) PCT Pub. No.: WO2004/083026

PCT Pub. Date: Sep. 30, 2004

(65) Prior Publication Data

US 2006/0198154 A1  Sep. 7, 2006

(30) Foreign Application Priority Data

Mar. 15, 2003 (GB) ................................. 0305998.7

(51) Int. Cl.
*B62J 6/00* (2006.01)
*F21V 33/00* (2006.01)
(52) U.S. Cl. ..................................................... 362/473
(58) Field of Classification Search ................. 362/473
See application file for complete search history.

(56) References Cited

U.S. PATENT DOCUMENTS

| | | | | |
|---|---|---|---|---|
| 5,197,795 A | * | 3/1993 | Mudrovich | 362/473 |
| 5,379,197 A | | 1/1995 | Conyers | |
| 6,506,026 B2 | * | 1/2003 | Wu | 417/234 |

FOREIGN PATENT DOCUMENTS

| | | | | |
|---|---|---|---|---|
| DE | 2927762 | A | | 1/1981 |
| DE | 3138831 | A | * | 5/1983 |
| DE | 3506049 | A | | 8/1986 |
| DE | 19512647 | C | | 5/1996 |
| GB | L05910 | A | | 11/1911 |

* cited by examiner

*Primary Examiner*—Ali Alavi
*Assistant Examiner*—William J Carter
(74) *Attorney, Agent, or Firm*—Woodard, Emhardt, Moriarty, McNett & Henry LLP

(57) ABSTRACT

A vehicle safety warning signal system for use on a bicycle, motorcycle, or like vehicle comprises: an elongate air pump (101) having a longitudinal length, the pump being provided to function as a visual warning device, such as, for example, by way of inclusion of an electrically powered light (105); and an attachment assembly configured to releasably attach the pump to the vehicle for operation in providing a visual warning signal, wherein: the attachment assembly is configured to hold the pump in at least a first position such that the longitudinal length of the pump is transverse to the main plane of the frame of the vehicle.

32 Claims, 23 Drawing Sheets

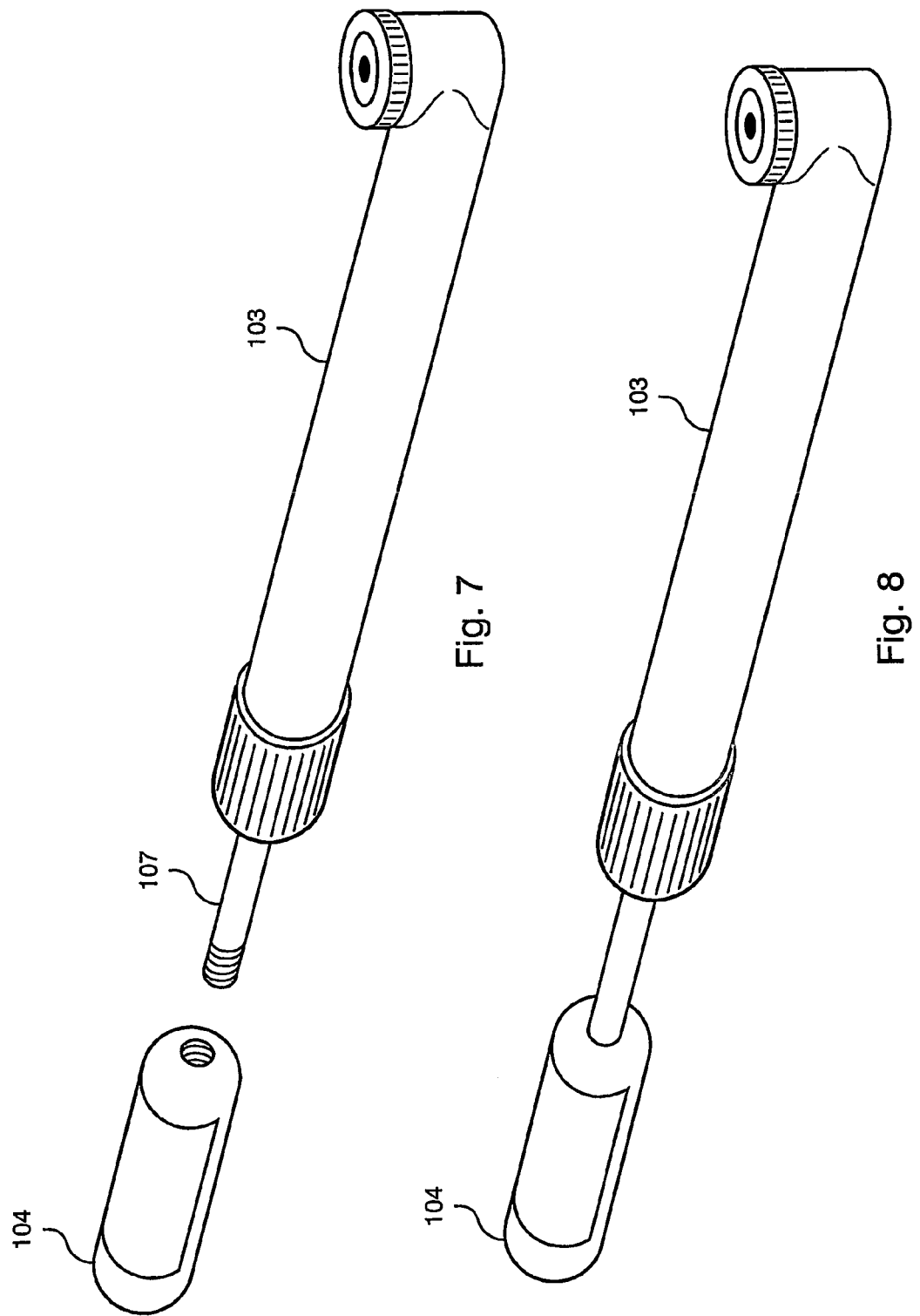

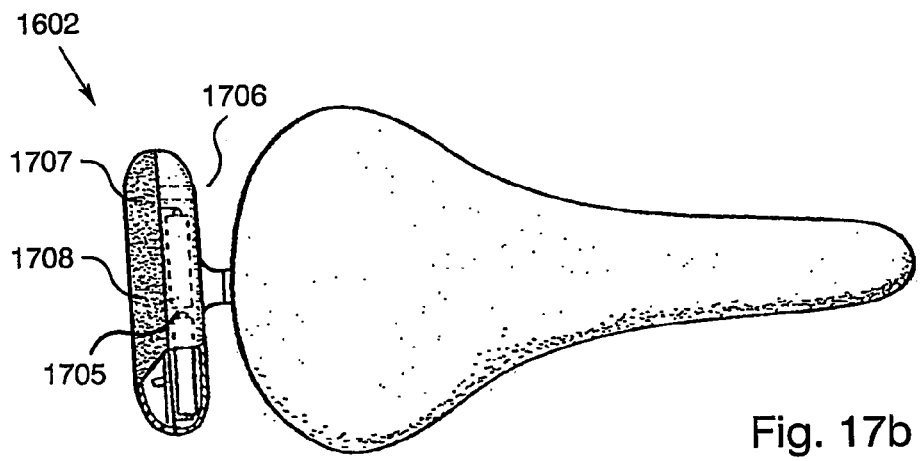
Fig. 17b
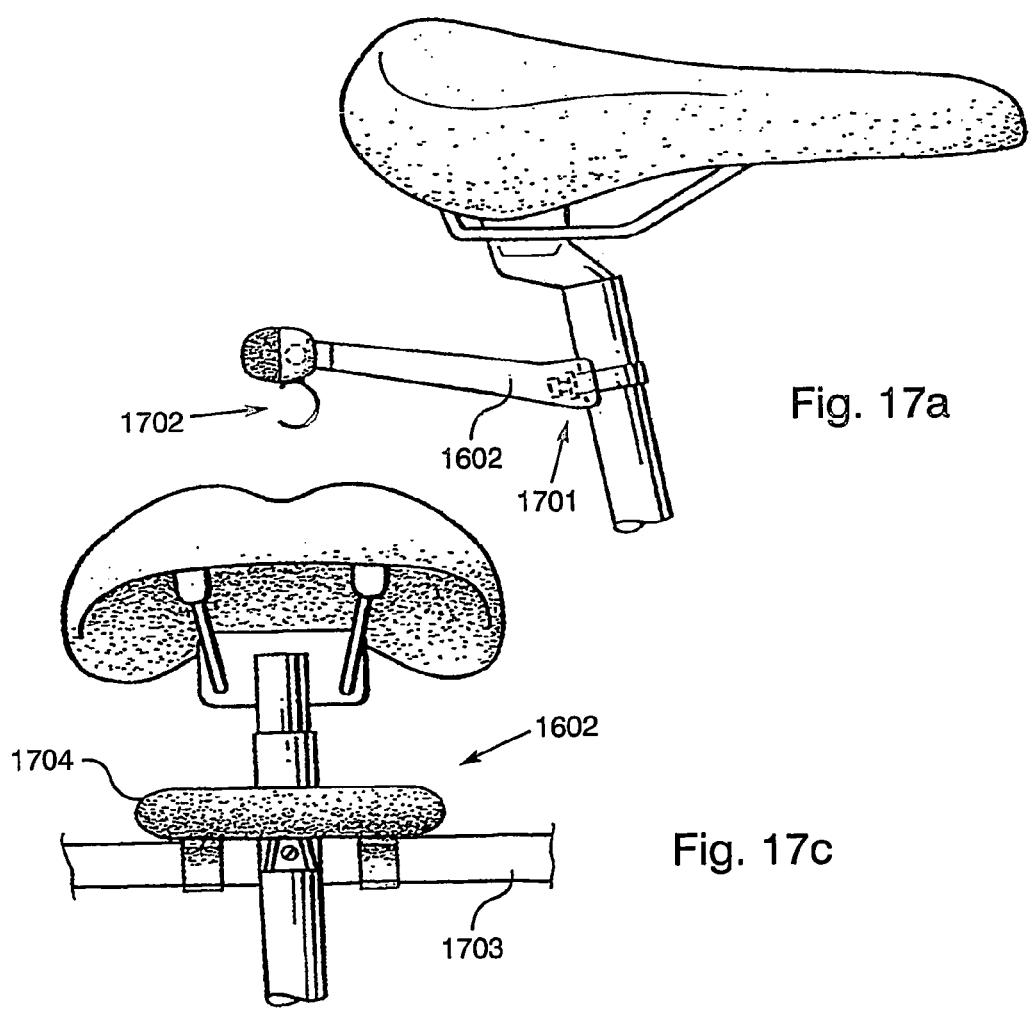
Fig. 17a
Fig. 17c

VEHICLE SAFETY WARNING SIGNAL DEVICES AND SYSTEM FOR USE ON A BICYCLE, MOTORCYCLE OR LIKE VEHICLE

FIELD OF THE INVENTION

The present invention relates to the field of vehicle safety. The invention particularly, but not exclusively, relates to the field of vehicle safety warning signal devices comprising one or more lighting devices. More particularly, but not exclusively, the invention relates to vehicle safety distance warning devices and systems of the type configured for use on a bicycle, motorcycle or like vehicle.

BACKGROUND TO THE INVENTION

Vehicle safety devices and systems, such as devices and system comprising lights are known for use on bicycles, motorcycles or like vehicles.

Typically such two wheeled or three wheeled vehicles are operated by a person riding the vehicle via peddling a geared chain and cog arrangement whilst the vehicle is steered by a set of suitably configured handle bars. Persons' riding such vehicles are directly exposed to traffic that passes by as well as on coming traffic. Riding of such vehicles is known to be associated with a relatively high degree of risk in terms of danger to the rider. To reduce the risk of a collision with another vehicle that is passing by from behind, oncoming or coming from a side direction it is known to have a configuration of visual warning signal devices located at various points on the vehicle.

British patent publication no. GB 2374656 (Beard) discloses a bicycle light attached to the ends of the handle bars and configured to emit white light in a first direction and red light in the opposite direction. In this way a warning signal is respectively provided to oncoming traffic and traffic coming from behind. The system disclosed in GB 2374656 is advantageously used in combination with a traditional "back and front" bicycle light arrangement since it provides a visual warning signal to vehicles that are passing by as regards the extent of the space occupied by the rider of a vehicle and therefore aids the driver of a passing vehicle to keep a safe distance from the rider's vehicle.

Further vehicle safety lighting systems are known, such as, for example, that disclosed in U.S. Pat. No. 5,379,197 (Conyers GPMRR Enterprises). This reference discloses an apparatus configured for use towards the rear of the vehicle and which comprises an elongate member having an illuminating lens that extends beyond the side of the vehicle, the device also being able to be stored in a vertical position behind the seat of the bicycle. In its operational position this device provides a similar safety function to that described in GB 2374656, in that it provides a "distance" warning to passing vehicles.

Yet a further vehicle warning signal device, configured for use on bicycles and motorcycles, is disclosed in U.S. Pat. No. 4,342,280 (Ashworth). This device comprises a warning reflector that is configured to protrude from the side of the vehicle to which it is attached. Again this kind of device is configured to act as a signal for indicating distance between a passing vehicle and the riders vehicle.

In view of increasing motorized traffic on the roads there is a need to improve safety for riders of motorcycles, cycles and like vehicles. Furthermore, to reduce traffic congestion there is a need to encourage drivers of motorized vehicles to turn to alternative forms of transport, such as bicycles and like vehicles that are as safe as possible.

In view of the above there remains a need to further improve safety for riders of bicycle, motorcycle and like vehicles. Due to the nature of such vehicles there is an inherent lack of storage space with the vehicle controls and seating typically being exposed to the elements. Therefore it is of paramount importance to utilise any existing features and components of such vehicles so as to maximise efficiency. In particular it is desirable to incorporate improvements to vehicle safety lighting and light reflector systems as a part of pre-existing components.

SUMMARY OF THE INVENTION

An object of the present invention is to provide vehicle safety warning signal devices and a vehicle safety system that increases the safety of a person riding a road vehicle such as a bicycle, motorcycles, trike or like vehicle.

A further object of the present invention is to provide improved vehicle safety lighting for road vehicles.

A further object of the present invention is to provide improved vehicle safety lighting for two and three wheeled type vehicles, such as, for example, bicycles, motorcycles, tricycles, trikes or like vehicles.

A further object of the present invention is to provide vehicle safety distance warning devices and systems that are configured to provide a warning signal to vehicles that are passing by as regards the extent of the space occupied by the rider of a bicycle, motorcycle or like vehicle. In this way a further object of the invention is to aid the operator of a passing vehicle to keep a safe distance from the rider of a cycle, motorcycle, trike or like vehicle.

A further object of the present invention is to encourage riders (operators) of cycles, motorcycles or like vehicles to improve upon their personal safety when riding a given vehicle.

A further object of the present invention is to provide a vehicle safety warning device and system for use by a rider of a given vehicle wherein the device and system encompasses a degree of elegance as regards utilisation of existing componentary that is typically associated with such vehicles.

Yet a further object of the present invention is to provide a vehicle pump that comprises a warning signal device and whereby the pump may be used in an operational position on a given vehicle to indicate to a passing vehicle a minimum safe distance between the two vehicles.

Yet a further object of the present invention is to provide an attachment arrangement for attaching a pump to a vehicle, such as a bicycle, motorcycle or like vehicle, whereby the pump thereby functions to indicate the minimum distance available between the vehicle and a second vehicle passing the first vehicle.

Yet a further object of the present invention is to provide an attachment arrangement which enables a plurality of operational configurations to be made possible for the positioning of a vehicle safety warning device comprising a pump, as configured in accordance with the present invention, on a given vehicle.

Yet a further object of the present invention is, with respect to a first vehicle, to provide an improved method of providing a distance warning to passing vehicles as regards a safe minimum distance that they may pass by the first vehicle.

According to a first aspect of the present invention there is provided a vehicle safety light device for use on a bicycle, motorcycle or like vehicle, said device characterised by comprising:

an elongate air pump having a main length, wherein said pump comprises at least one electrically powered visual warning light, said pump thereby being configured, following releasable attachment to an operational position on a said vehicle to provide a visual warning signal.

Preferably said pump comprises a telescopic hand pump of the type comprising an elongate air compression chamber and elongate piston-handle arrangement for effecting pumping.

Preferably said at least one light is configured to produce a light beam in a direction that is transverse to said main length of said pump.

Preferably said at least one light is configured to produce a light beam in a direction that is perpendicular to said main length of said pump.

Suitably said at least one electrically powered visual warning light is powered by one or more batteries.

Preferably said light is comprised as a part of the handle of said pump.

Preferably said at least one light is configured for use in providing a said visual warning signal at the back of said vehicle, said light being red in color.

Preferably said at least one light comprises an arrangement configured to emit white light in a first direction and red light in the diametrically opposite direction.

Preferably said pump comprises a locking means configured to releasably lock said handle of said pump in a fixed position relative to said air compression chamber.

Preferably a first and a second visual warning light are provided, said first visual warning light being comprised as part of said handle and said second visual warning light being comprised as part of said compression chamber portion of said pump.

In a particularly preferred embodiment said piston shaft comprises lighting means to illuminate said shaft.

In a further particularly preferred embodiment the pump handle is detachable from the remainder of the pump, said handle comprising at least one visual warning light.

According to a second aspect of the present invention there is provided a vehicle safety warning signal system for use on a bicycle, motorcycle, or like vehicle, said system characterised in that it comprises:

an elongate air pump having a main length, wherein said pump is provided to function as a visual warning device; and an attachment assembly configured to releasably attach said pump to a said vehicle for operation in providing a visual warning signal, wherein:

said attachment assembly, when in use with said pump on said vehicle, is configured to hold said pump in at least a first position such that said main length of said pump is transverse to the main plane of the frame of said vehicle.

Preferably said pump comprises a telescopic hand pump of the type comprising an elongate air compression chamber and an elongate piston-handle arrangement for effecting pumping.

Preferably said pump comprises at least one visual warning device element selected from the set comprising: an electrically powered light and a reflector unit.

Preferably said at least one visual warning device element is located in said handle.

Preferably said pump comprises a visual warning light arrangement configured to provide a first light signal in a first direction and a second light signal in a diametrically opposite direction.

Preferably said pump comprises a first visual warning light comprised as part of said air compression chamber portion and a second visual warning light comprised as part of said pump handle.

Preferably said pump comprises a locking means configured to releasably lock said handle in a fixed position relative to said main body of said pump.

Preferably said locking means comprises a convex cone locking bush.

Preferably said pump comprises lighting means configured to illuminate the piston shaft of said pump.

Preferably said attachment assembly comprises a pivot to enable said pump to be rotated in a plane from its in use position to a storage position.

Preferably said attachment assembly comprises means for detachably holding said pump at a distance from said seat pillar and means for attaching said attachment assembly to a vehicle seat pillar.

Preferably said pump comprises at least one light configured to produce a light beam in a direction that is transverse to said main length of said pump.

Preferably said pump comprises a detachable handle comprising a light.

According to a third aspect of the present invention there is provided an attachment assembly characterised in that said assembly is configured to attach a vehicle safety warning signal device of the type comprising an elongate air pump having a main longitudinal length to a bicycle, motorcycle or like vehicle, said attachment arrangement comprising:

first attachment means for substantially permanently affixing said attachment arrangement to said vehicle or to an object attached to said vehicle; and second attachment means for allowing detachable attachment of said pump to said attachment assembly, said attachment assembly being configured to hold said pump in at least a first position such that said longitudinal length of said pump is transverse to the main plane of the frame of said vehicle.

Preferably said first attachment means is configured to fix said attachment arrangement to a seat pillar of a said vehicle.

Preferably said first attachment means is located towards a first end of a first elongate member, said first elongate member being coupled at a second end to a second elongate member, said second elongate member being substantially perpendicular in orientation relative to said first elongate member.

Preferably said assembly is formed as an integral part of a seat of a said vehicle, said first and said second attachment means thereby comprising an integrally formed part of said seat.

Preferably said first attachment means is coupled to said second attachment means via a pivot, said pivot thereby enabling said second attachment means to pivot about said first attachment means.

Preferably when said assembly is attached to a said vehicle said second attachment means rotates in a plane that is transverse to the main plane of the frame of the vehicle.

Preferably when said assembly is attached to a said vehicle said second attachment means rotates in a plane that is substantially perpendicular to the main plane of the frame of the vehicle.

According to a fourth aspect of the present invention there is provided a vehicle safety warning signal device for use on a bicycle, motorcycle or like vehicle, said device characterised by comprising:

an elongate air pump having a longitudinal axis, said pump comprising:

a main body comprising an air compression chamber having a valve assembly for releasing air from within said chamber;

a piston, piston shaft and handle assembly for effecting compression of air in said compression chamber, said handle being connected to the opposite end of said piston shaft to said piston; and a locking mechanism for substantially preventing at least translational movement of said piston shaft relative to said compression chamber when said device is configured for use as a vehicle safety warning signal device with said piston shaft in an extended position from said compression chamber.

Preferably said prevented movement additionally comprises prevention of rotational movement of said piston shaft about said longitudinal axis relative to said compression chamber.

Preferably said locking mechanism enables said piston shaft to be locked in a plurality of extended positions from said compression chamber.

Preferably said locking mechanism comprises a convex cone locking bush.

Preferably said pump additionally comprises a high visibility element.

Preferably said high visibility element comprises a reflector unit.

Preferably said high visibility element comprises an electrically powered light.

In accordance with a further aspect of the present invention there is provided a vehicle fitted with said system and a vehicle fitted with one or more of said devices.

In accordance with a further aspect of the present invention there is provided a vehicle pump characterised by being adapted for use as a vehicle safety distance warning device.

In accordance with yet a further aspect of the present invention there is provided, on a first vehicle, a method of providing a distance safety warning to other vehicles, said method characterised by comprising:

attaching a pump having a longitudinal length to said first vehicle such that said longitudinal length is transverse to the main plane of the frame of said first vehicle.

In accordance with yet a further aspect of the present invention there is provided a vehicle safety distance warning system characterised by comprising:

an elongate air pump; and a bracket for attaching said pump to said vehicle.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIGS. 7 and 8 further schematically illustrate a preferred embodiment of the present invention comprising a detachable handle of the type schematically illustrated in FIG. 4;

FIG. 15b illustrates the invention when in use in traffic;

FIGS. 17a, 17b & 17c respectively show side elevation view, plan view and end elevation (rear) view of a preferred attachment assembly for attaching a vehicle safety light device as configured in accordance with the present invention to a seat pillar of a vehicle;

DETAILED DESCRIPTION OF A SPECIFIC MODE FOR CARRYING OUT THE INVENTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
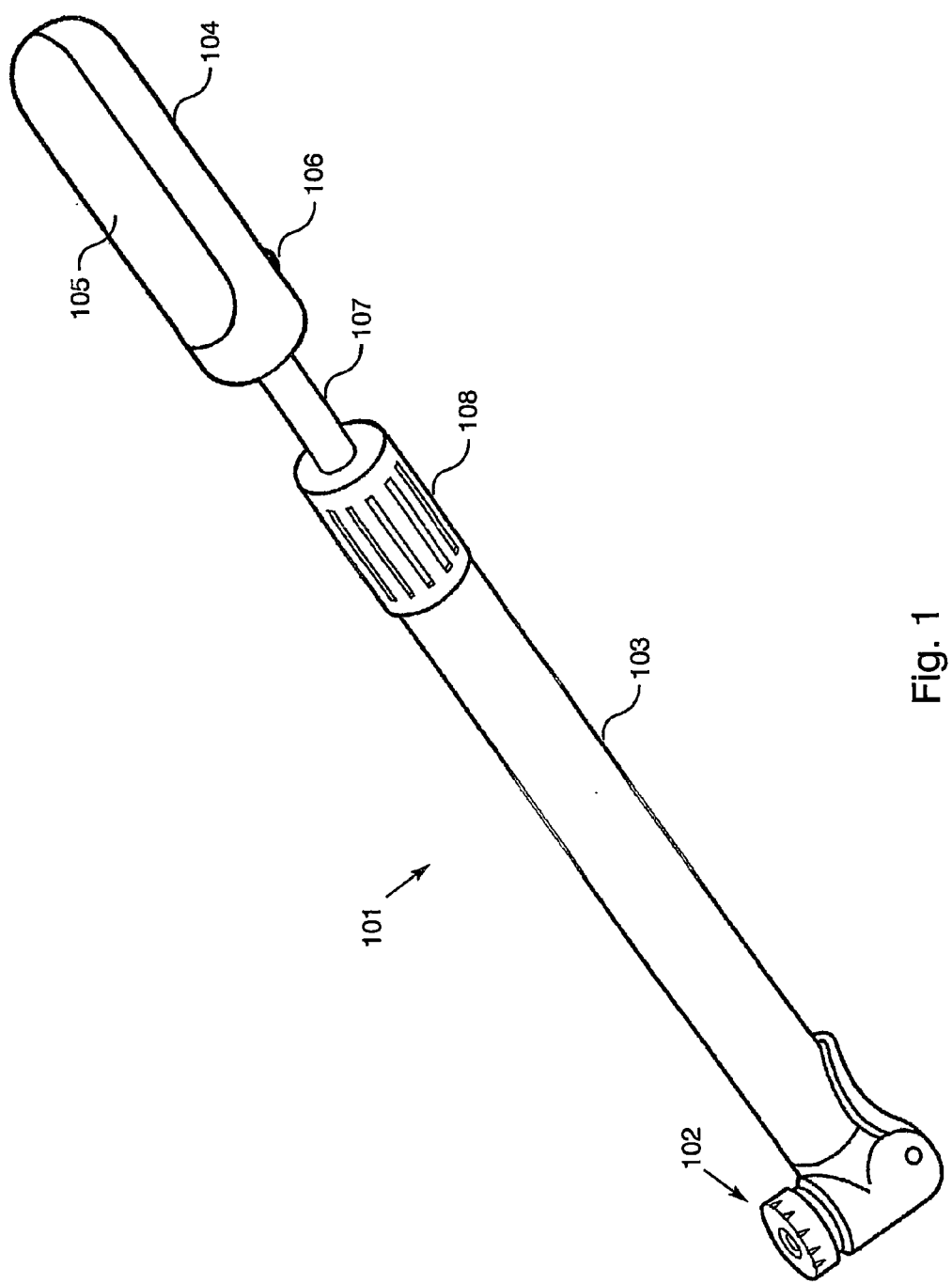
FIG. 1 schematically illustrates, in perspective view, a preferred embodiment of a vehicle safety warning device comprising, in accordance with the present invention, a pump.

FIG. 1 schematically illustrates, in perspective view, a preferred embodiment of a vehicle safety warning signal device as configured in accordance with the present invention. Vehicle safety warning signal device 101 is configured for use on a bicycle, motorcycle or like vehicle, and comprises an elongate air pump having a main length. The pump being elongate has a longitudinal length and a longitudinal axis. The air pump 101 is configured as a telescopic hand-type pump and comprises a valve assembly 102 for attaching to a tire to be inflated, an elongate air compression chamber 103 and a handle arrangement 104. The handle arrangement is connected to a piston arrangement operable inside air compression chamber 103 in the traditional manner. In accordance with the best mode contemplated by the inventor of the present invention, the air pump 101 comprises at least one high visibility visual warning element. By high visibility visual warning element it is meant something attached to or formed as an integral part of the pump which signals or enhances the pumps presence to an onlooker of the pump. In the best mode contemplated a suitable high visibility visual warning element comprises an electrically powered visual warning light 105 operable by an on/off switch 106. In accordance with the best mode contemplated, at least one visual warning light is located in handle 104. However, the skilled person in the art will readily realise that one or more visual warning lights may be located in the structure of pump assembly 101. Those skilled in the art will realise that it may be beneficial to have a pump assembly comprising a first visual warning device such as a light 105 located in handle 104 and a second visual warning device located towards the end of the pump comprising the valve assembly 102. In the best mode the pump handle 104 located at the end of piston shaft 107 is provided with a visual warning element 105. In this case it is then required that the non-valve assembly end of air compression chamber 103 is provided with a locking device so as to lock the piston shaft-handle arrangement in a fixed operational position on a given vehicle to which the device is attached. Locking means 108 is configured to rotate upon rotational forces being applied by an operator's hand, the rotation effecting a locking member inside air compression chamber 103 to effect a frictional force on the piston shaft 107 so as to prevent the handle rotating and/or moving translationally towards or from the air compression chamber when the pump is in use on a given vehicle as a visual warning signal device.

Figure 2A:
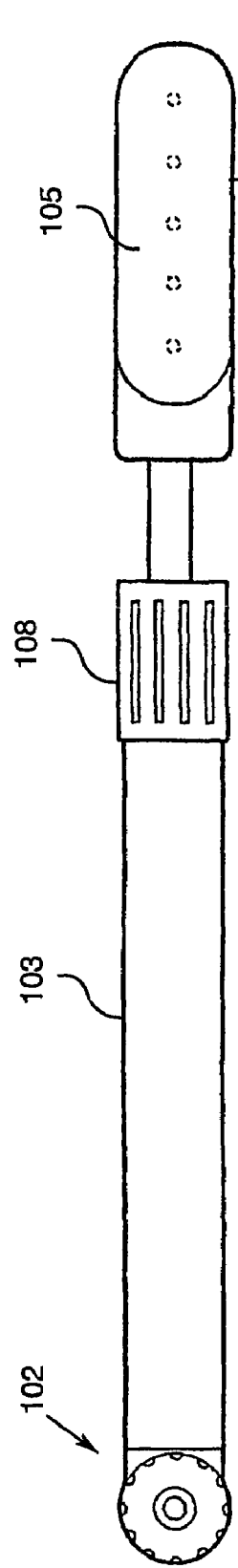
FIGS. 2a to 2c respectively schematically illustrate a plan view from above, a side elevation view and a plan view from below, of the vehicle safety warning device of FIG. 1.
Figure 2B:
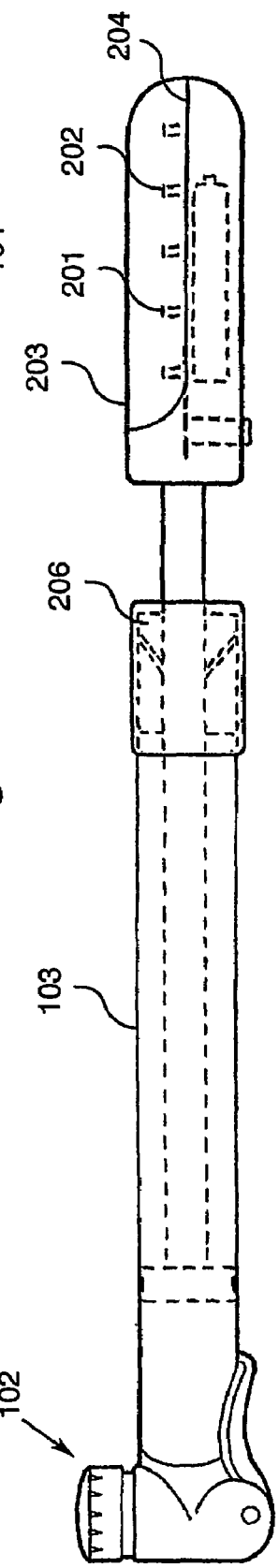
Figure 2C:
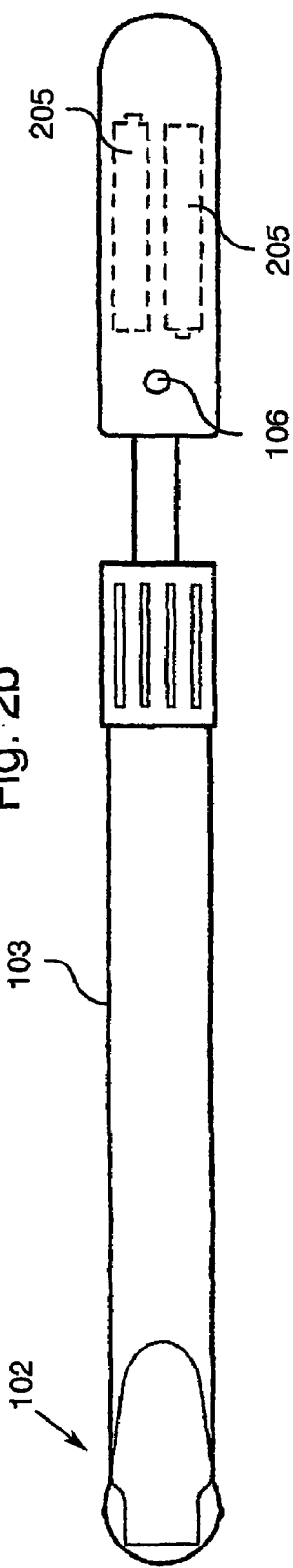

FIGS. 2a to 2c respectively schematically illustrate a plan view from above, a side elevation view and a plan view from below, of a vehicle safety distance warning device of the type shown in FIG. 1. FIG. 2a further details the visual warning light element 105. Lighting element 105 comprises a plastics based transparent cover so as to permit light to emanate from a light source located within the handle. FIG. 2b further details the internal components of handle 104.

Handle 104 comprises a plurality of light emitting diodes (LED's) 201, 202 configured to emit light through the transparent screen member 203. The LED's are located on a printed circuit board 204 and are operable by on/off switch 106.

The electrical power for the device is provided by one or more batteries, 205.

The components are further illustrated in FIG. 2c. The locking means 108 is further detailed in FIG. 2b and comprises a conical shaped locking bush 206 which is shown in cross sectional view. In an alternative configuration the electrically powered light or lights may comprise conventional electric bulbs. The power supply can comprise batteries, but may comprise suitably configured connections to a dynamo system or one or more solar cells.

The vehicle safety warning device 101 is configurable to be used as part of a vehicle safety warning system for use on bicycle, motorcycle or like vehicle, the system comprising an elongate air pump comprising a pump and an attachment means configured to releasably attach the pump to a vehicle for operation in providing a visual warning signal to passing traffic. In the best mode the system utilises a pump comprising a high visibility warning element such as an electrically powered light or a reflector unit. However those skilled in the art will readily appreciate that the system will provide distance warning signal benefits to a vehicle rider even when a pump that does not comprise a specifically configured warning element is used in conjunction with a suitably configured attachment assembly.

Figure 3:
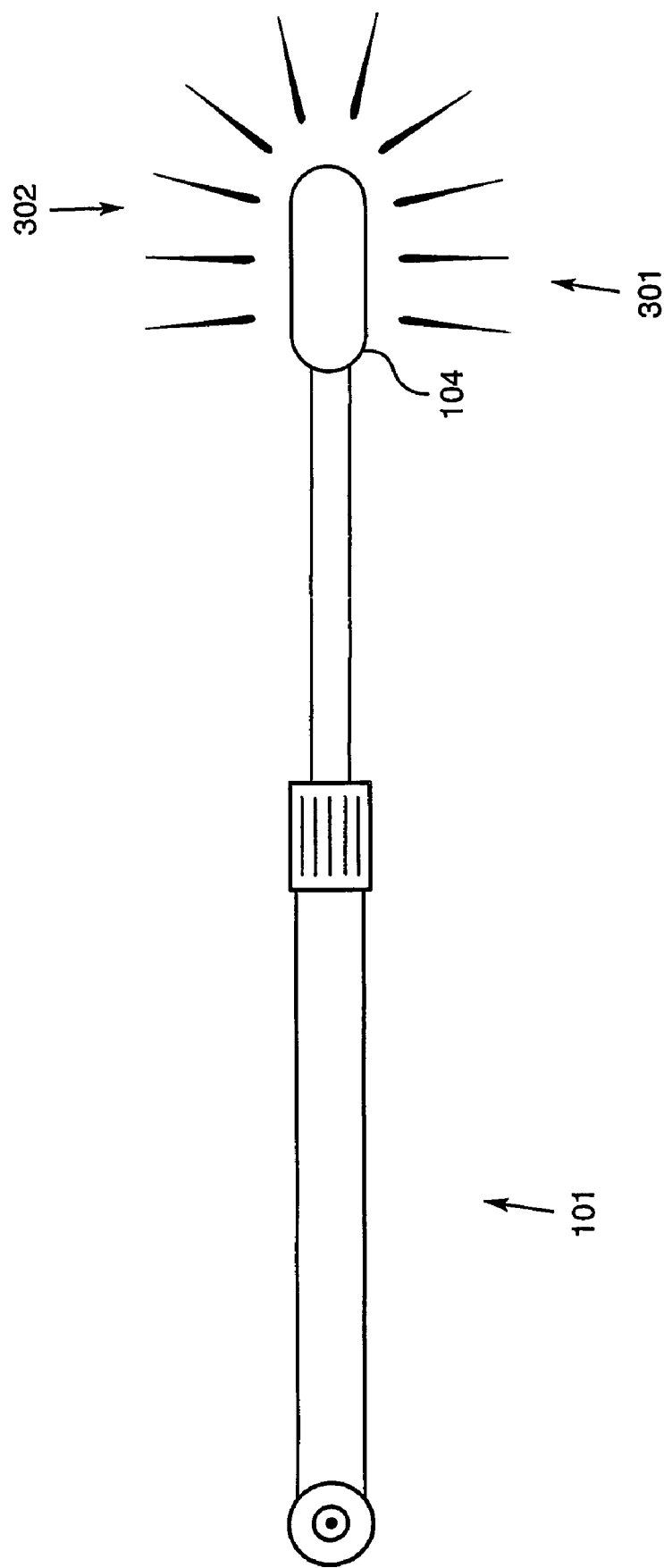
FIG. 3 further schematically illustrates the vehicle safety warning device of FIGS. 1 and 2 with the light in the handle switched on so as to emanate a visual warning signal in the form of visible electromagnetic radiation.

FIG. 3 further schematically illustrates the vehicle safety warning signal device 101 schematically illustrated in FIGS. 1 and 2. In the preferred embodiment illustrated the pump handle 104 comprises one or a plurality of electrically powered lamps. The one or more lamps may comprise conventional bulbs or some other light emitting system such as light emitting diodes. Whatever the lighting configuration adopted in handle 104 light is configured to emanate from handle 104 in at least a first substantially perpendicular direction relative to the longitudinal axis of the handle. In the best mode contemplated light is configured to emanate from the handle substantially from all points along its longitudinal length such as is shown at 301. In a further preferred embodiment light is configured to emanate in a bi-directional manner such that white light is generated in a first direction (shown at 301) and red light is configured to be generated in a second direction (shown at 302). In the case of a visual warning signal comprising use of light, the light is emitted light in the case of electric lights and reflected light if reflective elements are used.

Futhermore, as will be understood by those skilled in the art, the warning signal device may be configured such that a warning signal element, such as a light arrangement, is provided at both the valve end and handle end of the pump.

This provides an advantage in that with maximum or near-maximum extension of the pump the pump may then provide a deterrent at both sides of a given vehicle to which it is attached.

Figure 4:
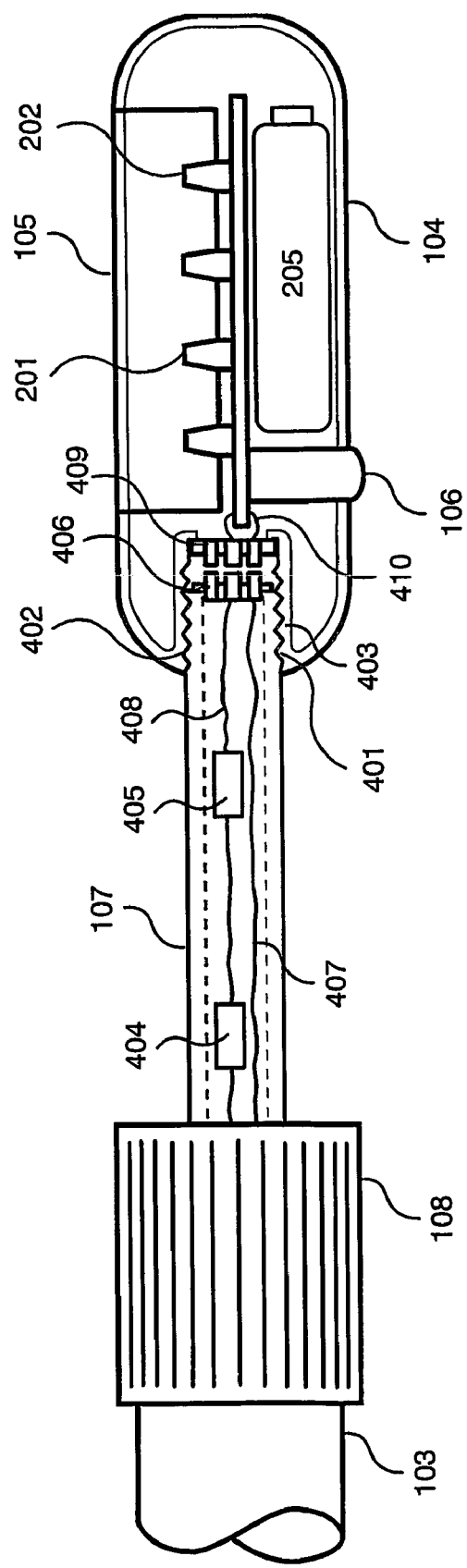
FIG. 4 schematically illustrates a further preferred embodiment of a pump as configured in accordance with the present invention such that both the handle and the piston shaft are configured to emit visible electromagnetic radiation and such that the handle is detachable.

FIG. 4 further details the preferred embodiment of handle arrangement 104 of vehicle safety warning signal device 101. In the best mode contemplated by the inventor the handle comprises a series of light emitting diodes 201, 202 powered by battery 205. More particularly, in the best mode contemplated, handle arrangement 104 is configured to detachably attach to piston shaft 107 so that handle arrangement 104 can be used independently of the remainder of the pump assembly. In the best mode contemplated the means for affecting detachment of handle arrangement 104 from piston shaft 107 is a screw and thread arrangement in which the piston shaft 107 comprises a series of screw threads 401, 402 about its surface such that it may be screwed in to a receiving portion 403 of handle arrangement 104. Receiving portion 403 thereby comprises a threaded arrangement such that piston shaft 107 may be screwed into handle 104 and held firmly in place. Equally piston shaft 107 may be un-screwed from handle arrangement 104 so that handle arrangement 104 may be used independently. In the best mode contemplated the piston shaft arrangement 107 itself comprises means for effecting light to be emitted from the piston shaft itself. Thus in the preferred embodiment, shaft 107 is comprised of a transparent material such as a clear plastics based rigid material having a series of light emitting elements located therein. In FIG. 4 such lighting elements are, in the best mode, a series of light emitting diodes 404, 405 electrically connected to an electrical connection assembly 406 via electrical current conducting wire 407, 408. The electrical connection assembly 406 of the piston shaft arrangement 107 is configured to electrically connect with electrical connection assembly 409 that is formed as a part of handle arrangement 104. Electrical connection assembly 409, in the best mode contemplated by the inventor, is configured as a male electrical connection ring that inserts within a ring shaped female socket located on electrical connection member 406 of the piston shaft arrangement 107. Those skilled in the art will realise that various other configurations of electrical fittings may be used instead of the ring and ring shaped socket mechanism, such as, for example, bayonet fittings and jack plug type fittings. The electrical connection assembly 409 of handle member 104 is connected to printed circuit board 204 via suitably configured electric current conducting connection wiring 410. The light emitting elements 404, 405 and associated wiring can be inserted in a hollow piston shaft made of a suitably strong substantially transparent plastics based material that forms the piston shaft itself. The advantage of having a light emitting piston shaft is that light can be emitted both from the handle and the piston shaft and thereby a "line" of light is created which offers a greater degree of visibility and therefore a greater degree of protection to a rider of a given vehicle. However other embodiments of piston shaft arrangement 107 can be envisaged wherein the lighting arrangement described above is replaced with a reflective element such that a reflective material is configured along the length of the piston shaft. In the preferred embodiment such reflective material would be positioned inside the piston shaft with the piston shaft itself being transparent to enable light to pass through and reflect off of the reflective material located inside. Alternatively the piston shaft itself could be made of a highly reflective material or it could have a surface coated with a suitable highly reflective material of the types known to those skilled in the art for use as reflective elements for cycles and cycle clothing.

Figure 5:
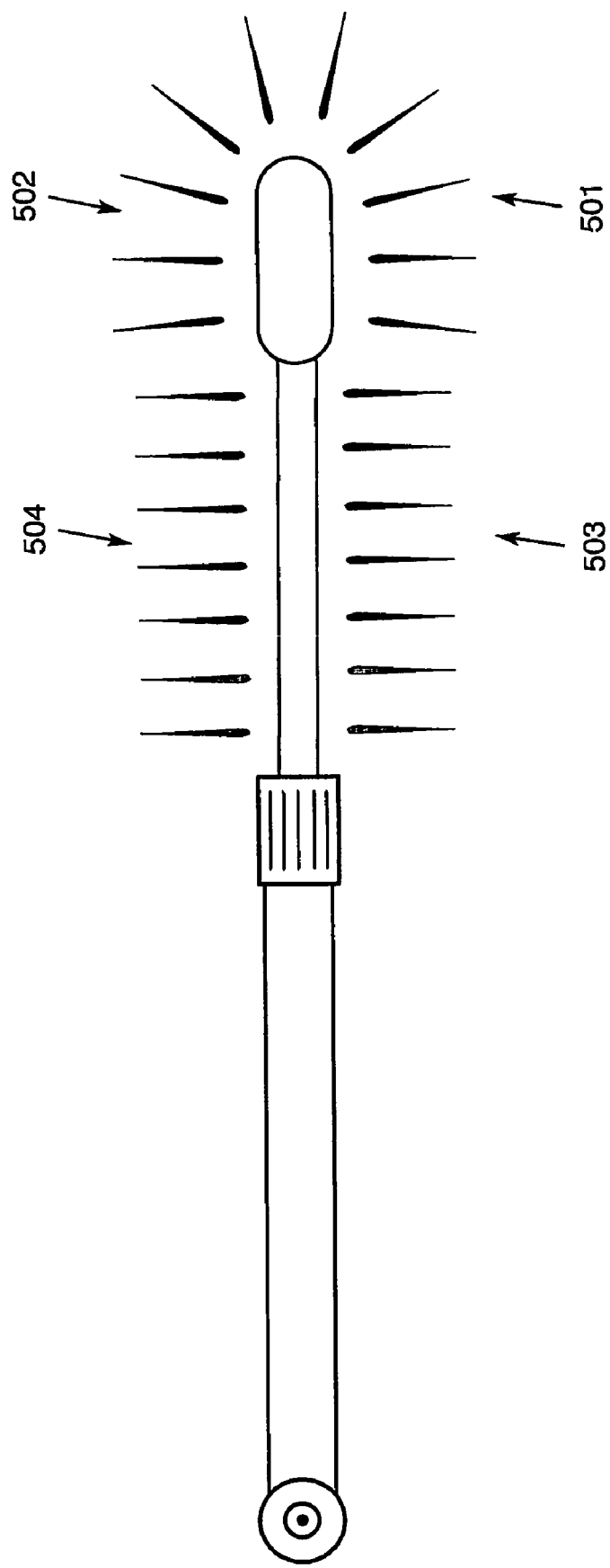
FIG. 5 further schematically illustrates the pump (configured as a visual warning signal device) of FIG. 4 wherein the handle and piston shaft lighting arrangements have been switched on so as to emit visible electromagnetic radiation from substantially the entire length of the piston shaft and handle arrangement.

FIG. 5 schematically illustrates use of the device illustrated in relation to FIG. 4. Both the lights in the handle and the lights in the piston shaft have been turned on. Light is emitted from the light emitting diodes substantially located along the entire length of handle 104 and in the example illustrated the light is emitted in a plurality of directions generally indicated at 501, 502. Similarly light is shown as emitted in a plurality of directions 503, 504 from substantially the entire length of piston shaft 107. In this way the pump-light device illustrated forms a highly visible member when attached to a given vehicle and used in 5 hours of darkness or during daylight.

Figure 6:
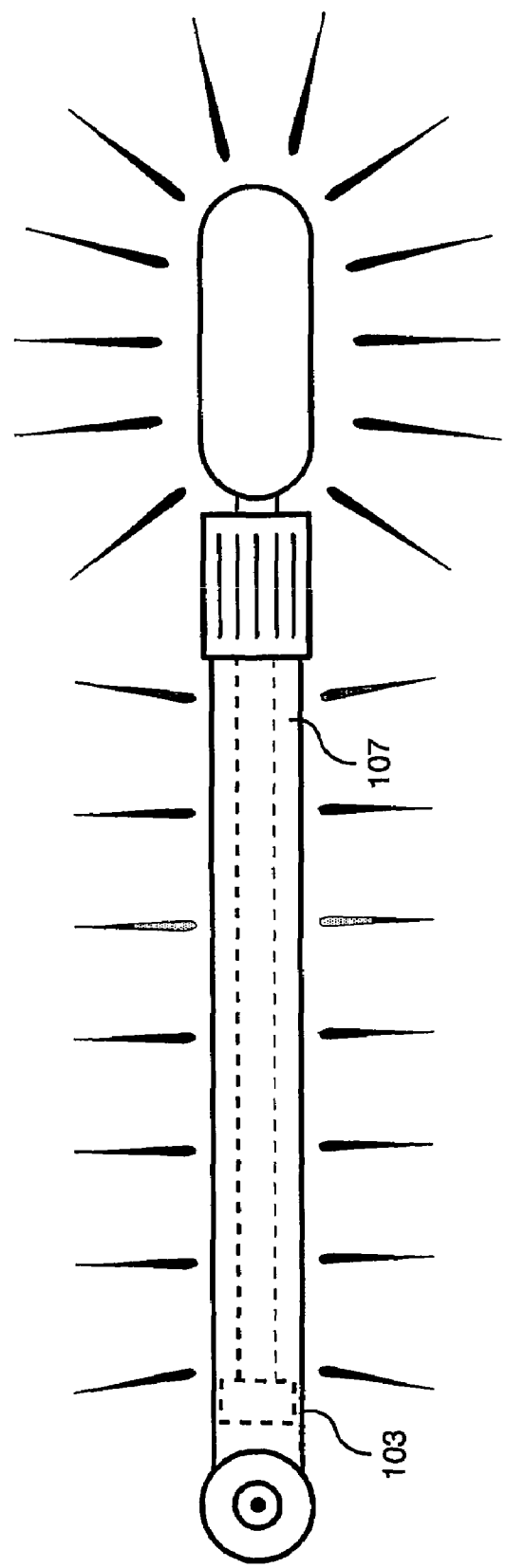
FIG. 6 schematically illustrates yet a further preferred embodiment of a pump as configured in accordance with the present invention, the pump comprising means for emitting light from the piston shaft of the pump.

FIG. 6 schematically illustrates yet a further preferred embodiment of the vehicle safety warning signal device as configured in accordance with the present invention. In FIG. 6 not only is the handle configured to emit light, but the air compression chamber 103 is also configured to emit light. In the example shown air compression chamber 103 is configured to emit light by virtue of the compression chamber being comprised of a transparent material. In this way the light emitting piston shaft arrangement schematically illustrated in FIG. 4 is allowed to emit light through the transparent walls of air compression chamber 103. In the preferred embodiment the compression chamber is transparent and clear in color. Those skilled in the art will appreciate that different coloured lights and/or different coloured transparent materials for the handle/piston shaft/compression chamber could be used to achieve a particular light color that is required.

As an alternative mechanism for illuminating a pump piston shaft or rod, the illumination of the shaft may be realised by shining a light down the transparent hollow shaft from the handle end. This method of illuminating the piston rod (and possibly the piston chamber should it also be transparent) utilises the optical qualities of transparent materials and may comprise use of fiber optic elements to direct light down the rod. Such fiber optic elements could be configured as a series, each element in the series having a different and greater length to the preceding member in the series thereby enabling the shaft to be illuminated at different points along its longitudinal length. Similarly, in the case of a reflective piston shaft, a reflective film could be inserted inside a suitably transparent piston shaft. As will be understood by those skilled in the art, a suitable reflective film could be of the type that comprises minute reflective glass beads attached to the surface of the film.

The detachable handle arrangement schematically illustrated in FIG. 4 is further detailed in FIGS. 7 and 8. In FIG. 7 handle 104 has been removed from piston shaft arrangement 107 by unscrewing handle 104 from shaft 107 in accordance with the screw thread arrangement 401 to 403. FIG. 8 schematically illustrates handle 104 attached to piston shaft 107 via the screw thread arrangement detailed in FIG. 4.

Figure 9:
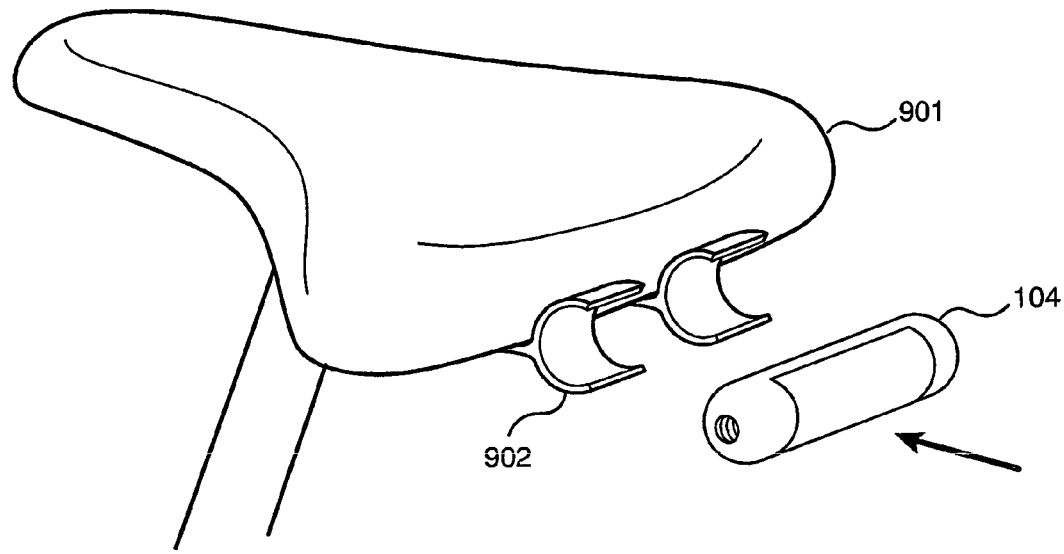
FIGS. 9 and 10 further schematically illustrate a preferred embodiment of the invention comprising the detachable handle arrangement as schematically illustrated in FIGS. 4, 7 and 8.
Figure 10:
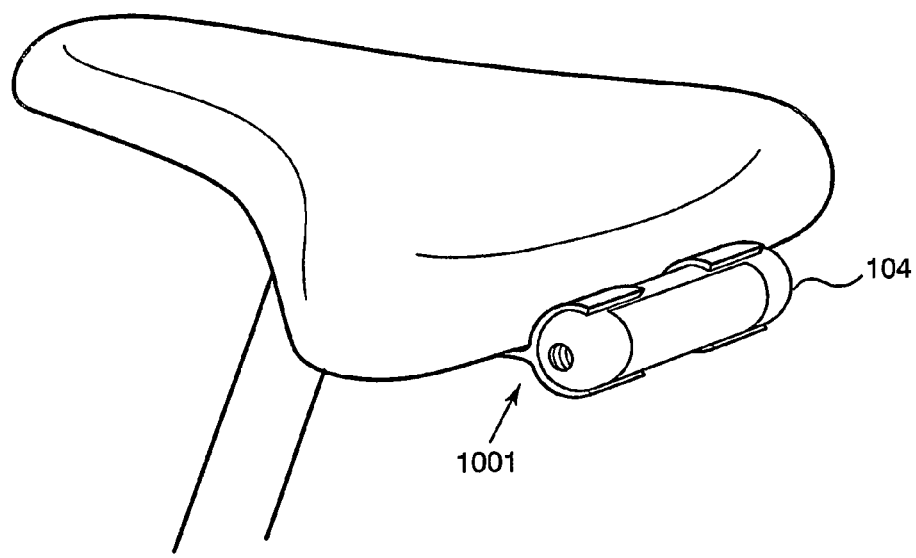

The advantage of having a detachable handle configured to provide a visual warning signal is that the handle may be used independently of the remainder of the pump assembly when the benefits of the elongated pump body extending away from the plane of the vehicle frame are not required. Thus the handle may be configured to be used elsewhere on the vehicle such as is schematically illustrated in FIGS. 9 and 10. FIG. 9 schematically illustrates handle 104 separated from the remainder of the pump and held in place towards the rear of a vehicle.

In the Figure the handle 104 may be suitably held in place behind a saddle 901 by use of a suitably configured clip arrangement 902. When handle arrangement 104 is held in clip arrangement 902, as is shown schematically at 1001 in FIG. 10, the pump handle provides a useful operation. In other words the handle functions as an independent light in the case when the handle comprises a lighting arrangement (or as a reflector in the case when the handle comprises one or more high visibility reflection elements).

Figure 11:
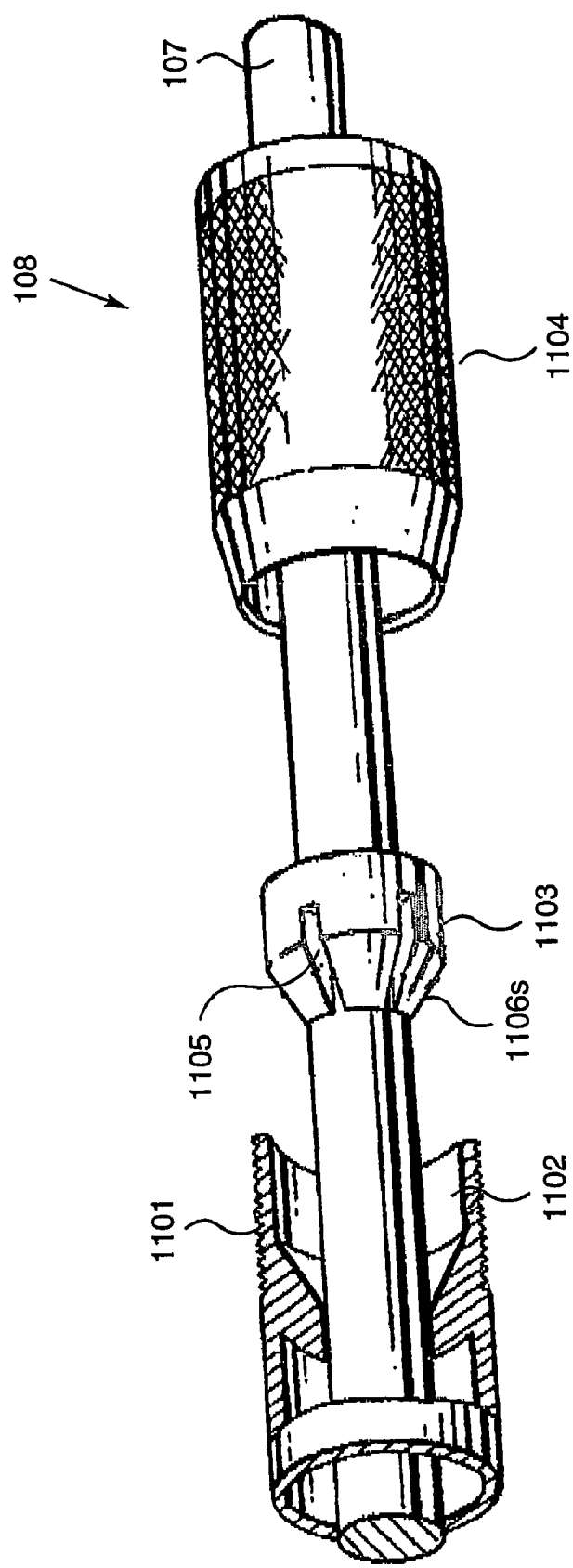
FIG. 11 schematically illustrates, in perspective view, a preferred mechanism, for the locking means identified in FIG. 1.

The locking mechanism 108 shown in FIGS. 1 and 2 is further illustrated schematically, in perspective exploded view in FIG. 11. The locking means is intended to ensure that, during operation on a given vehicle, light emitting from (or in the case of a reflective element, light reflected from) visual warning signal device 105 is directed in a constant direction since without the locking means 108 the pump handle would otherwise be inclined to rotate relative to the main body of the air compression chamber 103. In the preferred embodiment, locking arrangement 108 comprises a threaded screwed upper portion 1101 of air compression chamber 103, the upper portion comprising an internal shaped region 1102 that is configured to receive a convex cone locking bush 1103. A shaft grippable locking member sleeve type handle 1104 is configured to rotate about piston shaft 107 and via the interlocking threads to force the locking cone bush member 1103 into the receiving orifice 1102. Locking handle member 1104 is configured with an internal thread configured to engage with threaded portion 1101 of the air compression chamber. Thus in effect, handle member 1104 acts as a sleeve rotating about threaded portion 1101 and as member 1104 is turned so as to force convex cone 1103 into orifice 1102 the piston is thereby locked in place due to the friction applied to the shaft via the interlocking threads and the locking cone. The locking cone is configured with a plurality of split 1105, 1106 located around its circumference, the splits facilitating pressure to be exerted by member 1104 upon the portions of the cone between the splits. The splits also facilitate in releasing the lock when desired.

Various other forms of locking mechanism may be suitable for use with the invention as will be readily realised by those skilled in the art. Thus, for example, a pin and hole "ratchet" type system could be employed to provide a desired fixed extension length (and/or anti-rotation mechanism). Those skilled in the art will realise that the locking mechanism described permits the handle and piston shaft to be extended longitudinally from and locked in position to the compression chamber at a plurality of positions. In this way the warning indicator distance required, that is the overall length of pump assembly when in use as a warning signal in accordance with the invention, can be set as desired. The overall length can be set from the minimum to the maximum by extending the piston shaft from its usual "storage" position at full insertion in the compression chamber to the fully extended position when the handle is at its greatest possible distance from the chamber.

Although the type of pump hereinbefore described comprises the conventional arrangement of a main air compression chamber and a handle to operate a piston the invention is applicable to various other configurations of elongate hand pumps where the pump operates in or is structured in a different manner. The body and shaft of such a pump may not be cylindrical, but could be, for example, hexagonal, square or some other shape which does not require a rotational locking device due to the inherent locking nature provided the shape of the piston shaft itself. However with the traditional pump arrangement of the type described both a rotational lock and a translational lock are required: an anti-rotation lock may be required to prevent the warning signal or signals from emitting light (or reflecting light, in the case of use of reflective elements) in undesirable directions and a translational lock is required to prevent the pump handle extending in and out of the air compression chamber during operation. In the case of one of more visual warning elements comprising electric lights located at a given position around the surface of the pump an anti-rotational locking mechanism ensures that the light emitted from the device is emitted in the required direction (forwards and/or backwards) at all times.

Figure 12:
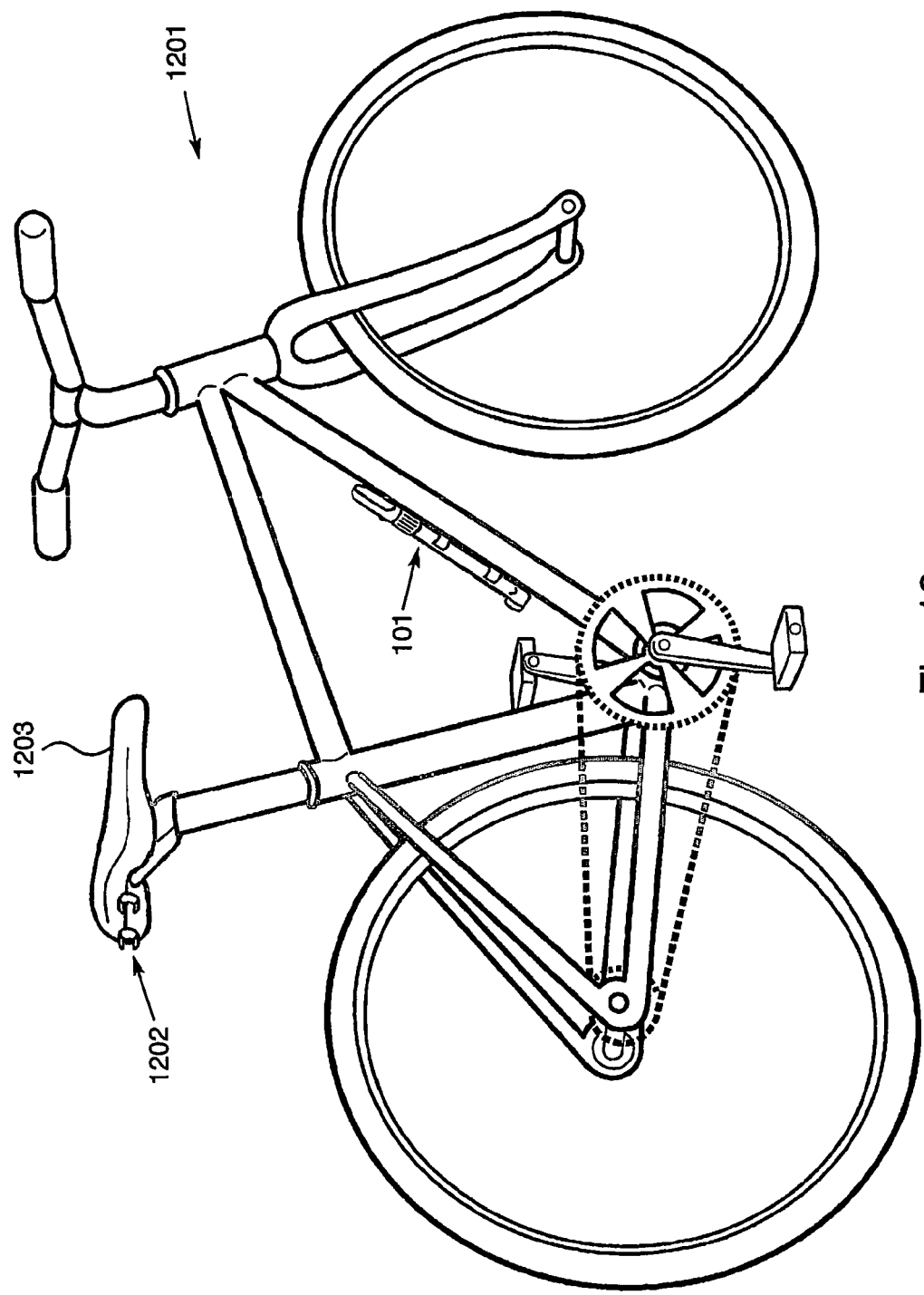
FIG. 12 schematically illustrates, in perspective view, the vehicle safety light device as detailed in FIG. 1 as stored in a storage position on a bicycle.

FIG. 12 schematically illustrates, in perspective view, the vehicle safety warning device as detailed in FIG. 1, as stored in a storage position on a bicycle 1201. The vehicle warning device 101 is readily stored in the same manner as a conventional telescopic hand bicycle pump at a suitable position on the frame of the vehicle. In accordance with the present invention, the vehicle warning signal device 101 is further configured to be placed in one or more operational "in-use" positions and in FIG. 12 the in-use position is configured as a clip arrangement 1202 located towards the rear of saddle 1203.

Figure 13:
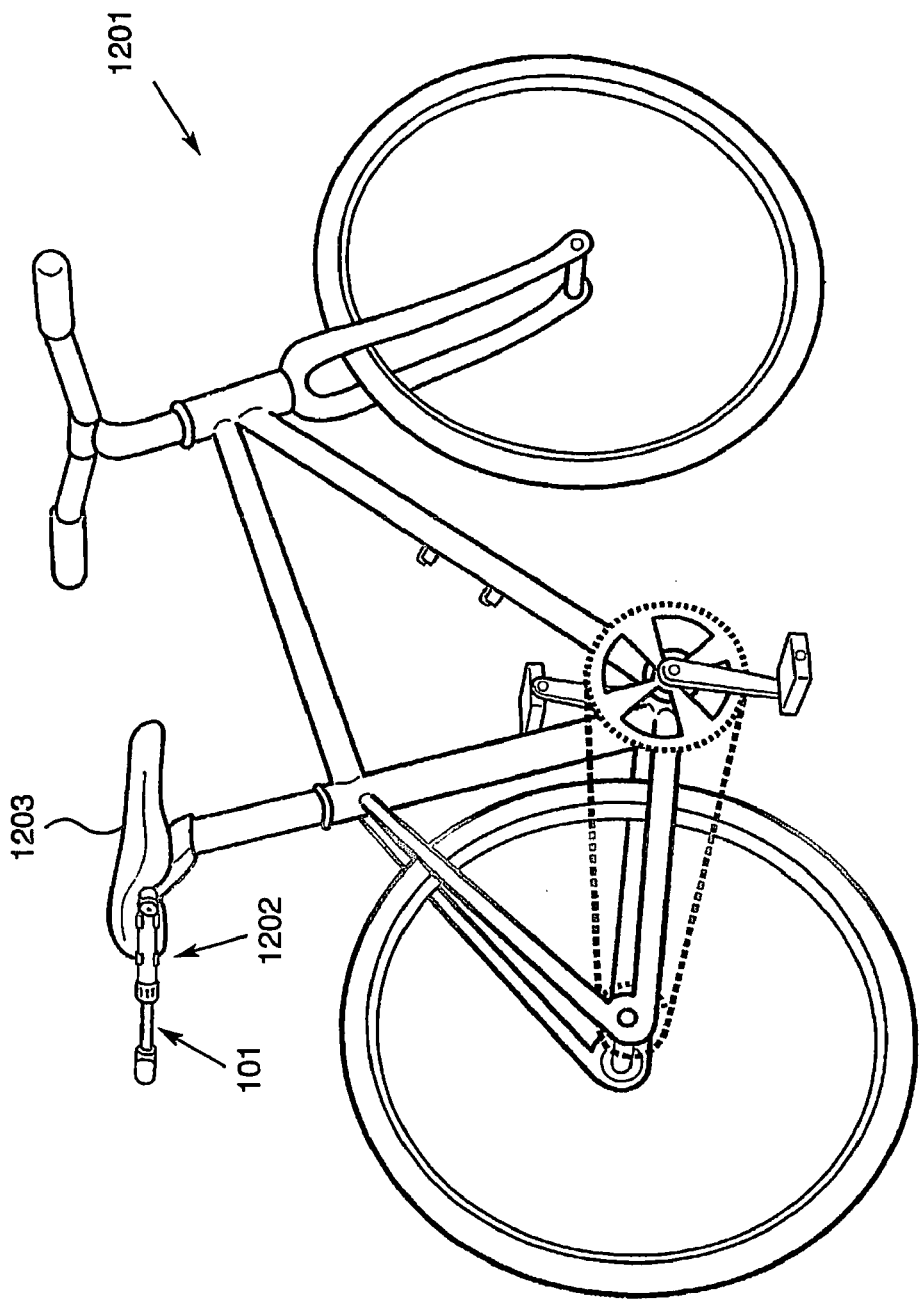
FIG. 13 schematically illustrates, in perspective view, the vehicle safety light device of FIGS. 1 to 3 in an in-use position on a bicycle.

FIG. 13 schematically illustrates, in perspective view, the vehicle safety warning signal device of FIGS. 1 to 12 in an in-use position on bicycle 1201. The vehicle warning signal device 101 is shown inserted into the attachment means comprising a pair of clips 1202 integrally formed as part of saddle 1203. In FIG. 13 pump handle 105 has been drawn out from the air compression chamber 103 so as to provide a visual warning light, located in the handle, that protrudes from the vehicle. The locking means 108 has been used to hold the visual warning signal handle member 105 in a fixed position, that is fixed in terms of the extension of the handle and the piston shaft to which it is attached out of the main body of the pump. In the preferred embodiment the position is also fixed such that the handle member does not rotate relative to the air compression chamber of the pump. In this way the visual warning signal element is kept in a fixed position during use relative to the frame of the vehicle. In FIG. 13 the clips are integrally formed as part of the saddle, but those skilled in the art will realise that a wide variety of possibilities exist as regards attaching the pump for use in operation. In the operational position the vehicle warning signal element 105 is, in the case of a light, configured to produce a light beam in a direction that is transverse to the main length of the pump. In practice it is highly desirable to arrange the device such that a light beam is produced in a direction that is perpendicular to the main length of the pump. Those skilled in the art will realise the reason for this from reviewing FIG. 13 in that passing traffic is then alerted to the vehicle due to the light emitted from handle arrangement 104. The light emitted in the embodiment shown is red light to indicate the rear of the vehicle as is common in vehicle lighting. However the device may equally be used on the front of bicycle 1201 and then used to similarly emit red light if it is used to provide a signal to traffic coming from behind or to emit white light in the diametrically opposite direction if a warning is to given to oncoming traffic. In a preferred embodiment the warning signal device 101 is configured with a lighting arrangement such that white light is emitted in a first direction and red light is emitted in the opposite direction. By opposite direction it is meant that direction that is substantially 180 degrees from the first direction.

Figure 14A:
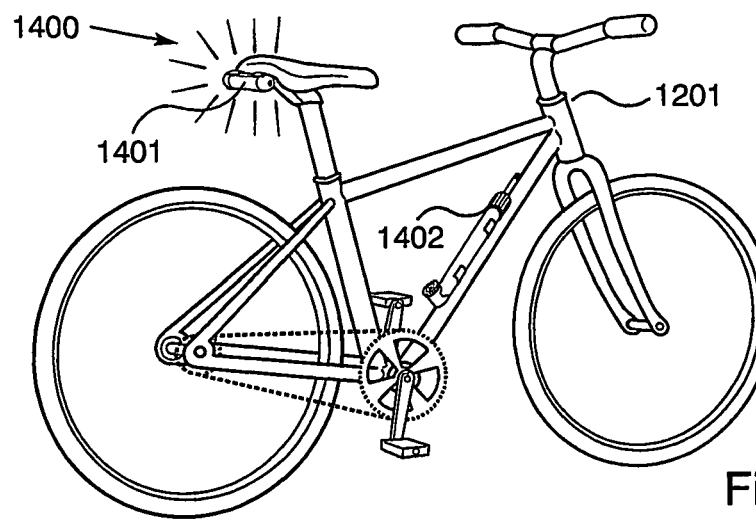
FIGS. 14a, 14b and 14c, respectively, schematically illustrate three operational arrangements of a pump as configured in accordance with the present invention when the pump is placed upon a given vehicle to provide a vehicle safety warning signal.
Figure 14B:
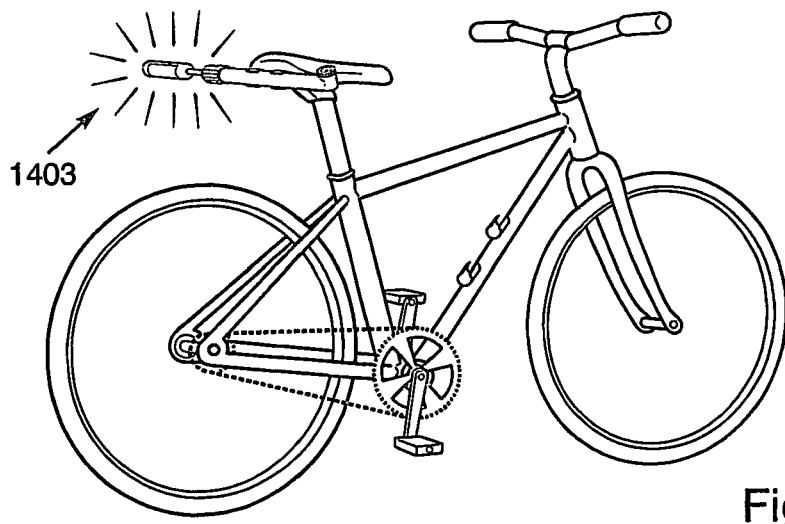
Figure 14C:
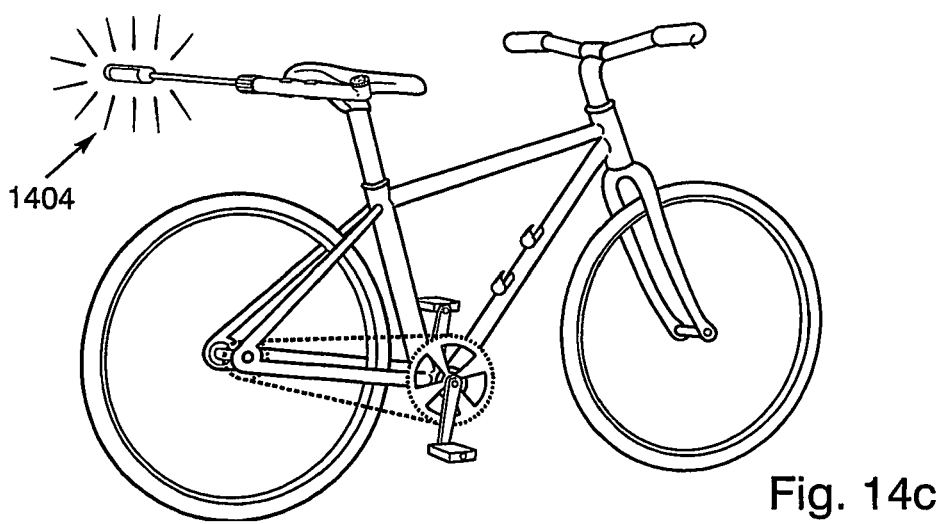

FIGS. 14a to 14c schematically illustrate modes of use of a vehicle safety warning signal device as configured in accordance with the present invention.

FIG. 14a schematically illustrates a first mode of operation 1400 wherein the handle 1401 of the pump has been detached from the remainder of the pump 1402. The remainder of the pump may be stored, as shown, on a position about a main frame portion of the bicycle.

FIG. 14b schematically illustrates a second mode of operation 1403 of a vehicle safety warning signal device as configured in accordance with the present invention wherein the pump body 1402 and pump handle 1401 are not separated and the piston is only partly drawn out from the air compression chamber. In FIG. 14b the warning signal device is thus shown with the handle, extended to some degree along the longitudinal axis of the pump, away from the remainder of the pump body and thus the device offers a warning signal to passing traffic with the handle located at a position such that it is partially extended from the remainder of the pump body.

FIG. 14c schematically illustrates a third mode of operation 1404 of a vehicle safety warning device as configured in accordance with the present invention wherein the handle is attached to the remainder of the pump, but the piston is fully extended from the compression chamber thereby positioning the light emitting handle at a maximum distance from the compression chamber. In this way the handle/pump arrangement provides a vehicle safety warning signal that is extends the maximum distance from the vehicle to which it is attached as is possible. The inventor has found that having a pump with a high visibility element located on the handle is particularly useful in deterring traffic from coming too close to the vehicle when the handle/piston is extended to full extent from the compression chamber. Traffic passing by the vehicle on the same side as the extended handle is thus deterred from coming too close to the vehicle as it passes by.

Figure 15A:
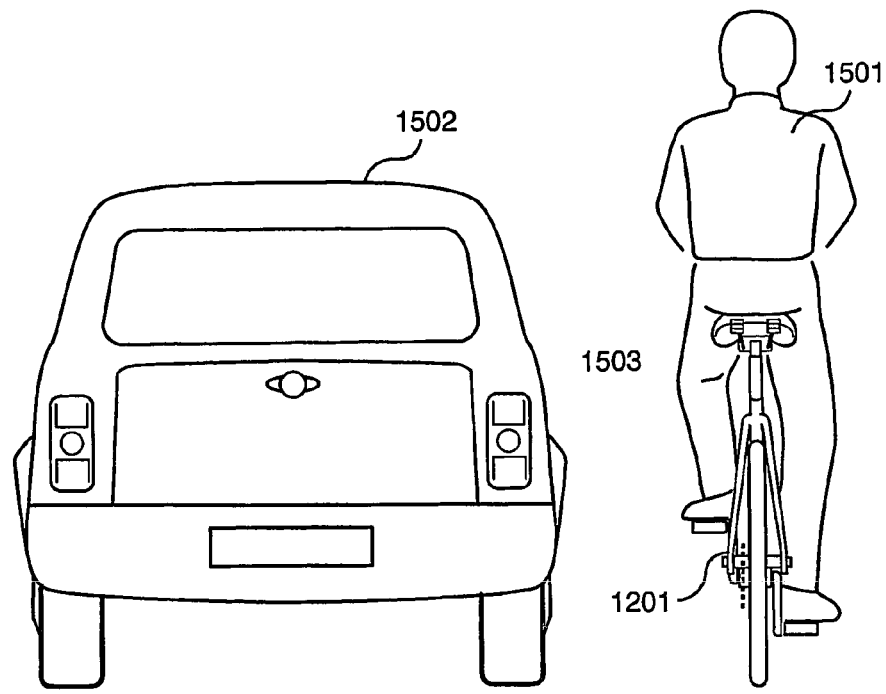
FIGS. 15a & 15b schematically illustrate the environment in which the invention is typically used, and in particular
Figure 15B:
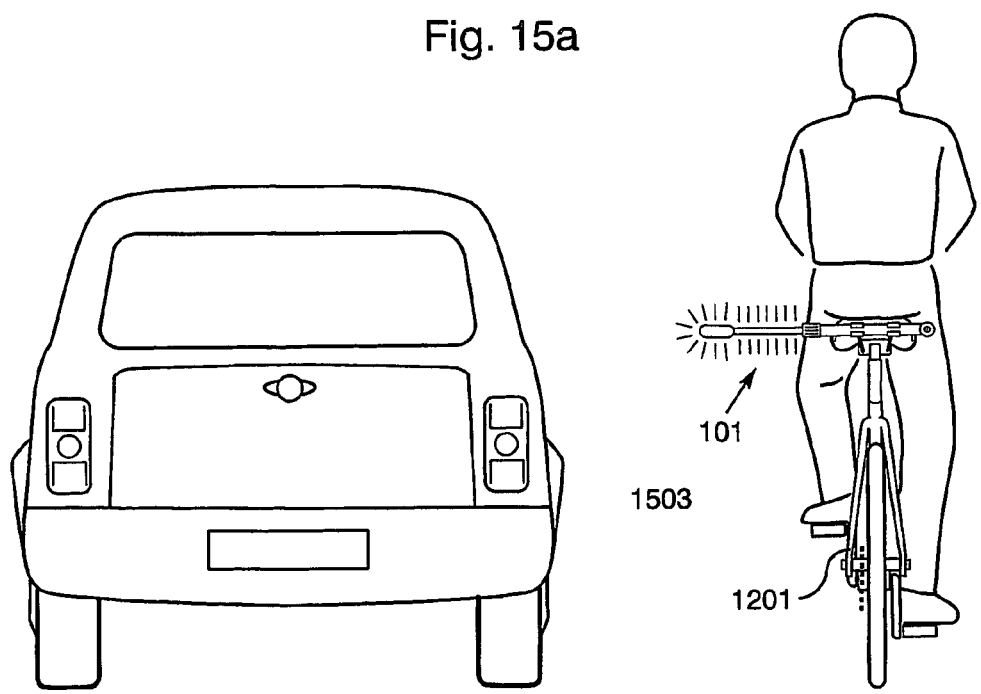

FIGS. 15a and 15b schematically illustrate an environment in which the invention is advantageously used. FIG. 15a shows a cyclist 1501 riding a bicycle 1201 and a car 1502 passing by. In this figure the vehicle warning signal device is stored in a storage position along the vehicle frame (not shown) and the region 1503 between the cyclist and car 1502 is seen to comprise a relatively small distance. In accordance with the best mode of the present invention, the vehicle warning signal device 101 may be placed in an in-use position such that a warning signal such as a light is provided to the side of the cyclist. In this way the driver of vehicle 1502 is deterred from driving too close to cyclist 1501, as is shown in FIG. 15b. In other words because of the cyclists usage of vehicle warning signal device 101 the driver of vehicle 1502 is deterred from driving too close to cyclist 1501.

In accordance with the present invention a pump may be used as a visual safety distance warning device towards the rear of a vehicle and suitably it may be attached directly to a vehicle saddle as described in relation to the preceding figures. However, direct attachment of the pump to a seat may require the seat itself to be provided with an attachment mechanism. A more versatile attachment assembly is desirable whereby the pump may be fixed via a bracket that attaches to a wide range of vehicles. In the best mode it is preferred to attach the pump via a bracket that is configured to affix to a seat pillar since, in the case of cycles at least, seat pillars are normally a common feature that are also usually of similar dimensions. Furthermore in at least the case of cycles such a bracket is required to hold the pump at a distance from the seat pillar such that the pump, when in use as a distance indicator, does not interfere with the cyclists peddling. Preferred embodiments of brackets that are suitable for attaching to a seat pillar of a cycle are described below. A common feature of the following brackets is that the bracket comprises an elongate extension member for ensuring that the pump is held at a distance that clears the cyclists legs when peddling the cycle.

Figure 16:
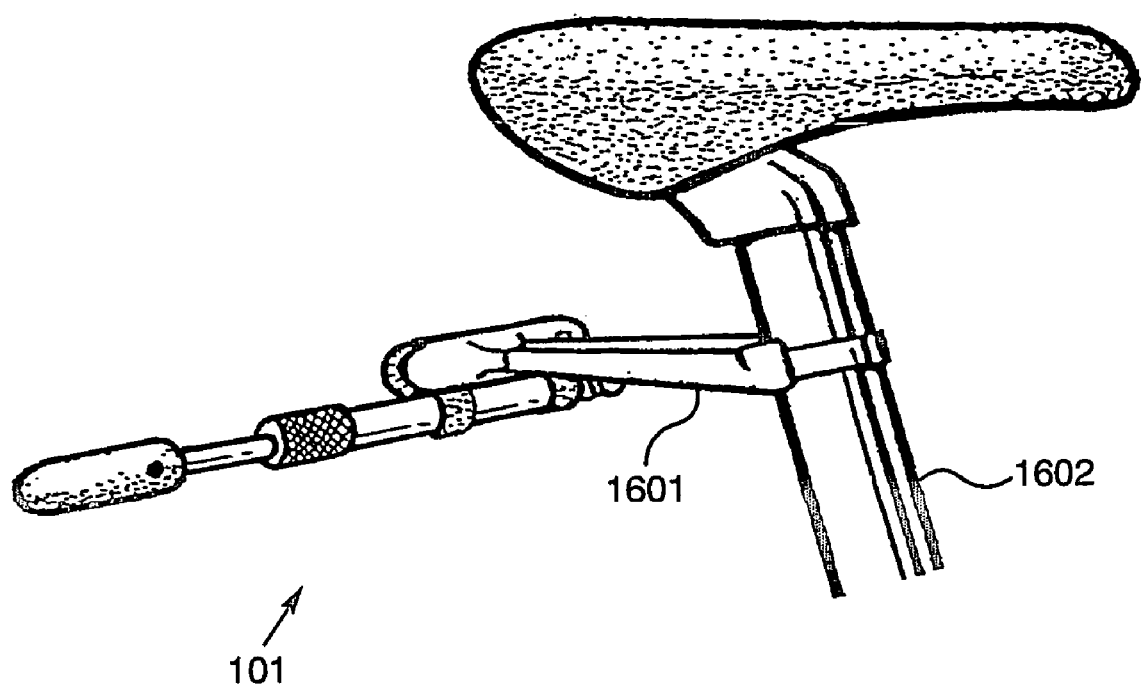
FIG. 16 schematically illustrates, in perspective view, a vehicle safety light device as configured in accordance with a preferred embodiment of the present invention and as attached, via an attachment assembly, to a seat pillar of a bicycle.

FIG. 16 schematically illustrates, in perspective view, a vehicle safety warning signal device 101 as configured in accordance with a preferred embodiment of the present invention and as attached, via an attachment means or bracket 1601 to a bicycle seat pillar 1602. Attachment bracket 1601 is configured to permit the main length of the visual warning light device 101 to be orientated in a plane that is perpendicular to the main plane of the frame of the bicycle.

FIGS. 17a, 17b and 17c respectively show the attachment arrangement 1601 in further detail in side elevation view, plan view and end elevation (rear) view. As shown in FIG. 16, the attachment assembly 1601 comprises a "T"-shaped device. The elongated "T" shape of the attachment assembly ensures that the pump, when held in position, is clear of a cyclist's feet. Member 1601 comprises a first attachment means 1701 for substantially permanently affixing the attachment arrangement 1601 to a vehicle or to an object attached to the vehicle and a second attachment means 1701 configured for allowing detachable attachment of the pump to the attachment arrangement. In the preferred embodiment the attachment means 1701 comprises one or more expandable clips wherein the body of the vehicle warning device 101 may be inserted and held in place. In the case of two wheeled vehicles such as cycles and motorcycles the attachment arrangement 1601 is configured to hold the pump in at least a first position such that a main length (that is the longitudinal axis) of the pump is transverse to the main plane of the frame of the vehicle. In the case of vehicles comprising three wheels such as trikes and tricycles the pump is held such that the longitudinal axis of the pump is transverse to a vertical plane when the vehicle is stood on a horizontal surface, but the terminology "transverse to the main plane of the frame" is to be understood herein as also covering this situation. The position of the pump is schematically illustrated in broken lines at 1703 in FIG. 17c. Although a clip type arrangement 1702 is preferred various other methods of fixing the pump to the vehicle are readily envisaged as those skilled in the art will appreciate. One such method makes use of press studs wherein male studs are molded onto the body of the pump and female stud holes are provided in the fixing bracket. A further method comprises use of a key and keyway wherein male dove-tailed keys are moulded laterally onto the body of the pump and female dove-tailed keyways are moulded into the fixing bracket. Yet further possibilities include the use of hook and loop type pile fabrics such as velcro (registered trade mark), use of semi-adhesive materials and magnetic means of attachment. In the preferred embodiment the entire pump 101 is finished with a reflective paint so as to aid in it's operational function of deterring traffic that is passing by from coming too close to a given cycle, motorcycle or like vehicle that is being ridden by a person.

The bracket arrangement 1601 may take various forms, but in a preferred embodiment the member that is transverse to a main plane through the frame of the bicycle, that is member 1704, may comprise a visual warning signal element such as an internal light or a reflector element so that the device itself acts as a rear light or reflector respectively.

Therefore in FIG. 17*b* a lighting arrangement is shown that comprises a battery 1705, switch 1706 and one or more light emitting diodes 1707, 1708.

Figure 18:
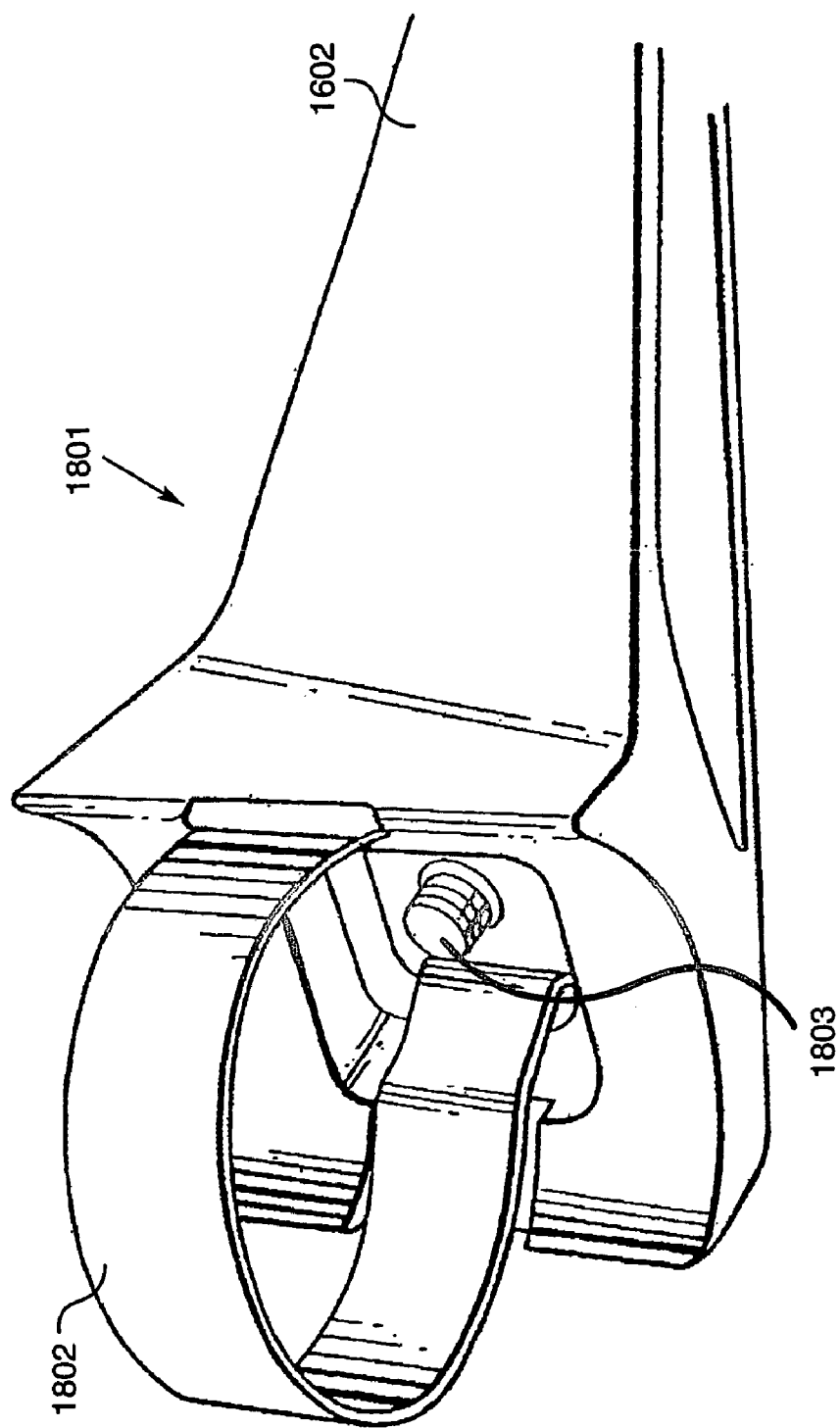
FIG. 18 further details the attachment assembly of FIGS. 17a to 17c.

A preferred embodiment of the first attachment means 1701 is further detailed in FIG. 18. The main body of the attachment means is indicated at 1801 and to the end of this is provided a fixed length releasable clip 1802 for positioning around a seat pillar of a given bicycle or motorcycle. The clip is tightened around the seat pillar by application of a locking screw 1803. Upon tightening locking screw 1803 a tension is applied to the clip about the seat pillar by virtue of locking screw 1803, upon tightening, pulling clip 1802 about the seat pillar. In this way the attachment arrangement 1601 may be substantially permanently fixed to a given seat pillar. However by use of locking screw 1803 the attachment arrangement may readily be removed from the seat pillar since upon a few turns of locking screw 1803 the clip means 1802 will be relaxed. Those skilled in the art will realise that there are many other suitable methods that would provide the required attachment means for holding a vehicle safety warning light device configured in accordance with the present invention in a required position and orientation relative to the bicycle or motorcycle frame. However the mechanism disclosed in FIG. 18 is simple to manufacture and quick and easy to fit to a vehicle.

The vehicle warning device 101 may be used either at the front or towards the rear of the vehicle to which it is attached. However in most applications it is envisaged that the device will be most useful when positioned towards the rear of the vehicle. Although the position schematically illustrated in FIG. 16, that is attachment to a seat pillar, is considered to be the best mode, other positions are possible. The attachment means described may be configured for substantially permanent fixing to a seat pillar or another portion of a vehicle or even to a component such as a saddle bag, a luggage carrier or a panier.

A further preferred embodiment of a vehicle safety warning signal device attachment means comprises an attachment means that is integrally moulded as part of a seating arrangement. Thus a molding may be configured on the underside or towards the rear of a bicycle saddle, for example, such that the molding itself effectively provides a first attachment means for substantially permanently fixing the attachment arrangement to the vehicle (via the saddle) and a second attachment means for allowing detachable attachment of the pump to the attachment arrangement. In this embodiment, the second attachment means may, for example, suitably comprise one or more plastics based spring clips. Furthermore, the first attachment means may be a simple molding to the saddle arrangement or may comprise a moulded "stem" portion extending from the saddle, such that the arrangement is substantially "T"-shaped.

In the various possible arrangements for an attachment arrangement configured to attach a device as configured in accordance with the present invention, the attachment arrangement may itself comprise a lighting device. Such light device of the attachment arrangement may form in integral fixed part of the arrangement or it may be detachable. Such an attachment arrangement comprising a light in this way provides the added advantage that the attachment arrangement may be used as an independent light, that is independent of a pump of the type configured in accordance with the present invention.

Although the preferred embodiments described above have been described in relation to a pump comprising one or a plurality of electric lights configured to act as visual warning signals to passing traffic, those skilled in the art will realise that a variety of other visual warning signals may be used instead of or in addition to electric lights. Thus reflector assemblies could be attached to a given pump or formed as an integral part of the pump. Those skilled in the art will realise that prison type reflectors would be particularly suitable in this respect. Other types of visual warning signal could also be utilised such as warning signals comprising movement of a body attached to a given pump. Such a moving body could comprise a series of ribbons or strings knotted at one, attached to the pump via the knotted end, thereby enabling the strings or ribbons hanging therefrom to "flutter" when the given vehicle to which the pump is attached is in motion. Such a system would be analogous to the situation wherein a long member carried on a car or van is typically made more visible by attaching a piece of elongate cloth to the end of the carried member, the cloth therefore being blown about by the turbulence of the wind passing over the vehicle when the vehicle is in motion.

Figure 19:
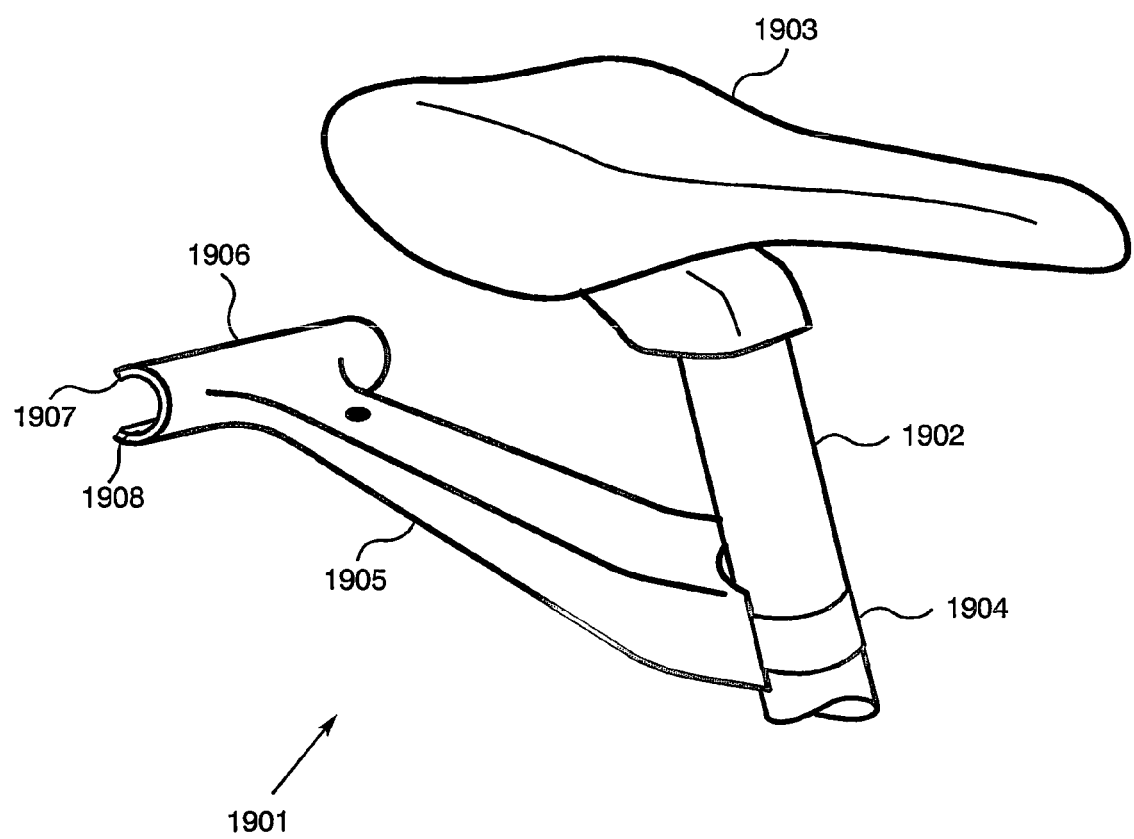
FIG. 19 schematically illustrates a further preferred embodiment of an attachment assembly for attaching a pump to a vehicle such that the pump is configured to thereby act as a warning signal to passing vehicles.
Figure 20:
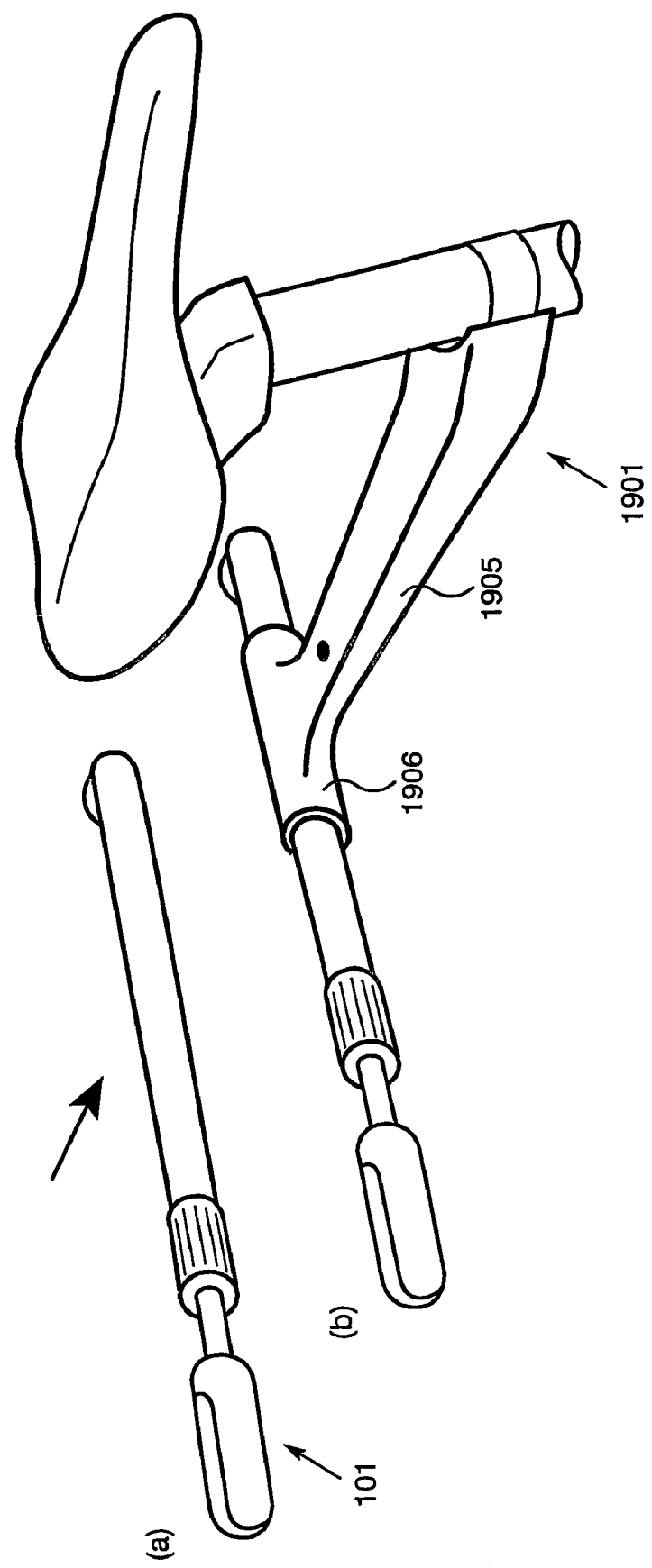
FIG. 20 illustrates the method for insertion of the pump into the bracket assembly illustrated in FIG. 19.

A further preferred embodiment of an attachment assembly for attaching a vehicle safety warning signal device of the type configured in accordance with the present invention to a vehicle is schematically illustrated in FIG. 19. Attachment assembly 1901 is shown as attached to a bicycle, motorcycle or like vehicle seat pillar 1902 wherein the seat pillar is configured to affix a saddle 1903 thereto. In contrast to the bracket illustrated in FIG. 17 assembly 1901 has been optimised in terms of cost of manufacture and ergonomic design. The attachment assembly 1901 comprises attachment means 1904 for attaching assembly 1901 to the seat pillar 1902. In the preferred embodiment attachment means 1904 is configured to operate substantially along the same lines as that described hereinbefore in relation to FIG. 18. Attachment means assembly 1901 may thus comprise a strap mechanism 1904 attached to an elongate extension member 1905, extension member 1905 being configured at the opposite end to strap system 1904 in a manner configured to hold a pump. As shown in the Figure assembly 1901 is substantially 'T'-shaped and comprises an elongate extension member portion 1905 and a second cross-member portion 1906 transverse to the longitudinal axis of and located towards one end of member portion 1905. In the best mode the longitudinal axis of members 1905 and 1906 are oriented at 90° to each other. Cross member end portion 1906, in the preferred embodiment, comprises a semi-circular shaped semi-flexible channel configured to enable a pump to be detachably attached thereto. In the best mode contemplated attachment assembly 1901 comprises an integral body of a moulded plastics based material that is suitably lightweight and which also has a degree of rigidity that is suitable for enabling jaw portions 1907 and 1908 of semi-circular fixing member 1906 to be placed around, snap into place and grip a pump placed therein. The pump holding portion 1906 comprises a main length that is perpendicular in orientation relative to the main length of extension portion 1905. In this way extension portion 1905 enables the pump connected to portion 1906 to be maintained in a position that is away from a given riders body and legs when the rider is operating the vehicle to which the attachment assembly 1901 is attached. Those skilled in the art will realise that the main body portions of attachment assembly 1901, that is members 1905 and 1906, may be made in a variety of ways and from a variety of materials. In the best mode contemplated by the inventor, a lightweight plastics based material is preferred since it is relatively straightforward to manufacture it as a single integral unit using standard plastics based manufacturing processes such as injection molding. Preferred dimensions are as follows:

length of extension member 1905, 170 mm (preferably at least 100 mm to ensure clearance of cyclists legs); and length of cross member 1906: 75 mm FIG. 20 schematically illustrates, in perspective view, the use of the bracket assembly of FIG. 19 to hold a vehicle safety warning signal device of the type schematically illustrated in the preceding Figures. At position (a) the vehicle safety warning signal device is shown in a position prior to insertion in the holding portion 1906 of attachment means assembly 1901. At position (b) in the Figure warning signal device 101 is shown as held within holding member portion 1906 of attachment means assembly 1901. Thus as can be seen from FIG. 20 the attachment arrangement is configured to hold the pump in at least a first position such that a main length of the pump is transverse to a vertical plane through the vehicle. In the Figure the plane occupied by the seat pillar and the longitudinal axis of the extension portion 1905 is defined by a vertical plane through the vehicle when the vehicle to which member 1901 is attached is in its normal resting position on a horizontal surface.

Figure 21A:
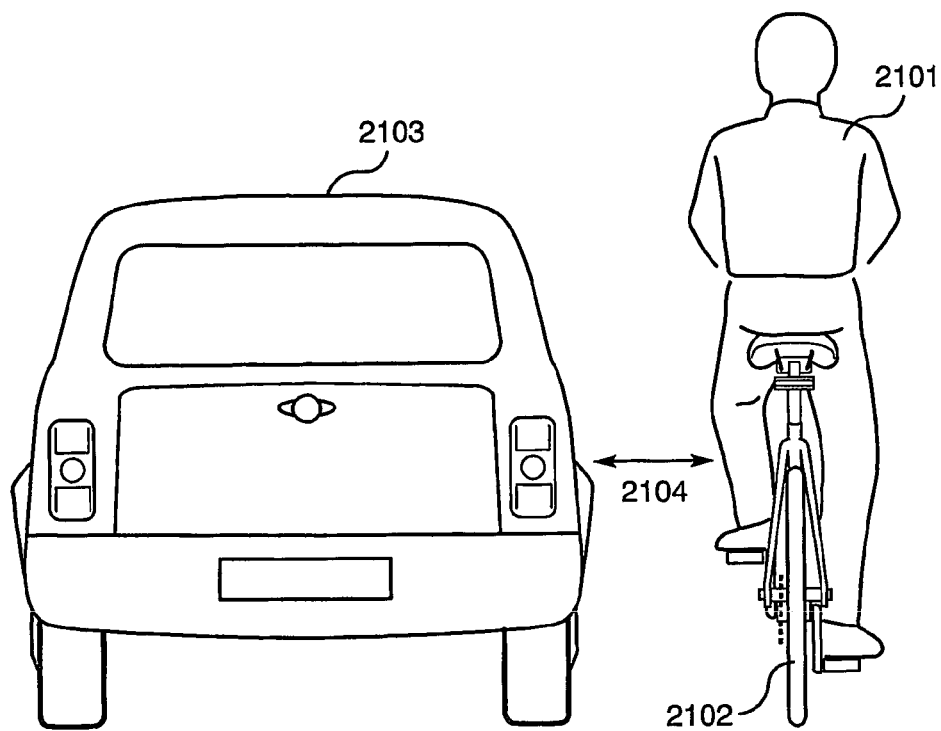
FIGS. 21a and 21b schematically illustrate the environment in which the invention is typically to be used, and in particular FIG. 21b schematically illustrates the invention in use in the situation where traffic is passing by a bicycle rider.
Figure 21B:
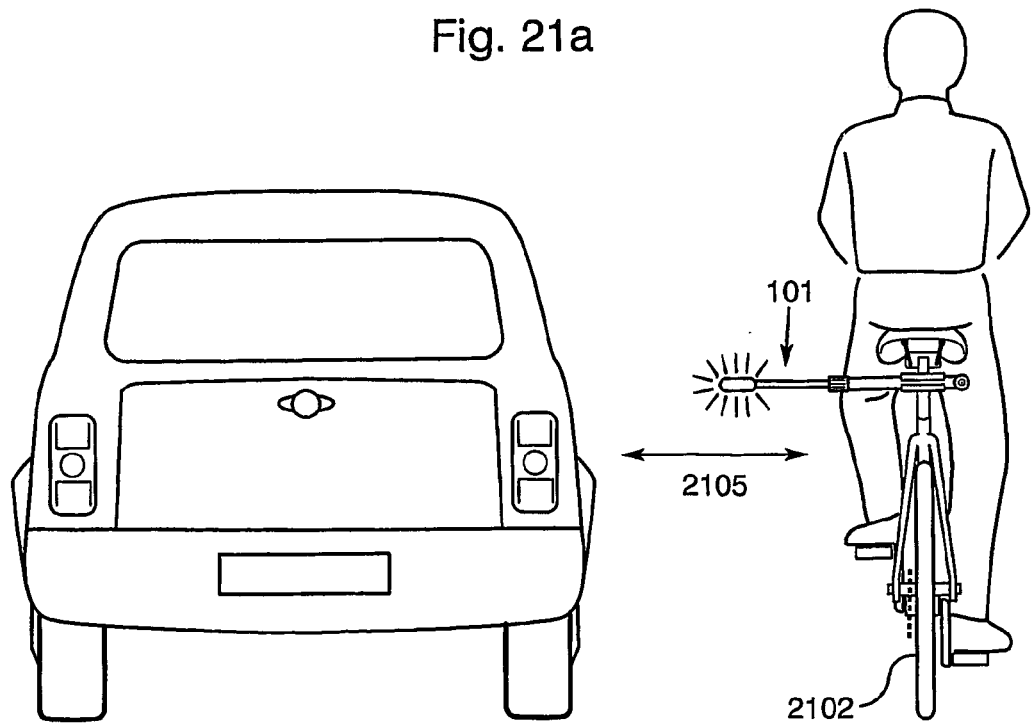

FIGS. 21a and 21b schematically illustrate the environment in which the invention is typically to be used, and in particular FIG. 21b schematically illustrates the invention in use in the situation where traffic is passing by a bicycle rider. FIG. 21a shows a cyclist 2101 on a bicycle 2102 which is being passed by a car 2103. The cyclist has not connected a pump based vehicle safety warning signal device of the present invention into an operational position configured to deter vehicle 2103 from passing cyclist 2101 too closely. Therefore the distance 2104 between the cyclist and the passing car is relatively undefinable and the driver of car 2103 may pass by the cyclist at a distance which is dangerous to the cyclists safety. The present invention attempts to improve the cyclist's safety by forcing the driver of vehicle 2103 to be more aware of and thereby increase the distance 2104.

In FIG. 21b the cyclist is shown as using the present invention towards the rear of vehicle 2102—as shown in FIG. 21b a vehicle safety warning device 101 is attached to the back of the vehicle 2102, the warning device comprising a pump with the piston rod extended from the remainder of the pump body to full extent. In the embodiment shown the piston rod comprises a handle at one end which comprises an electric light. In this way the distance 2105 between vehicle 2102 and car 2103 is increased since the driver of vehicle 2103 is persuaded to drive past vehicle 2102 at a greater distance form vehicle 2102 by virtue of the cyclists use of warning signal device 101.

The pump attachment assemblies described thus far are less than optimal in terms of easing the ability of the rider of a given vehicle to mount and dismount the vehicle when a pump is held in its position to provide a distance warning indicator to passing vehicles. A mechanism is required to enable the vehicle rider to swing the pump into an orientation such that the person's leg and foot do not catch the pump when mounting or dismounting. The inventor has found that it is therefore desirable to provide the bracket with a pivot such that the pump can be swung from its in-use position to a second position such that the pump remains attached to the bracket.

Figure 22:
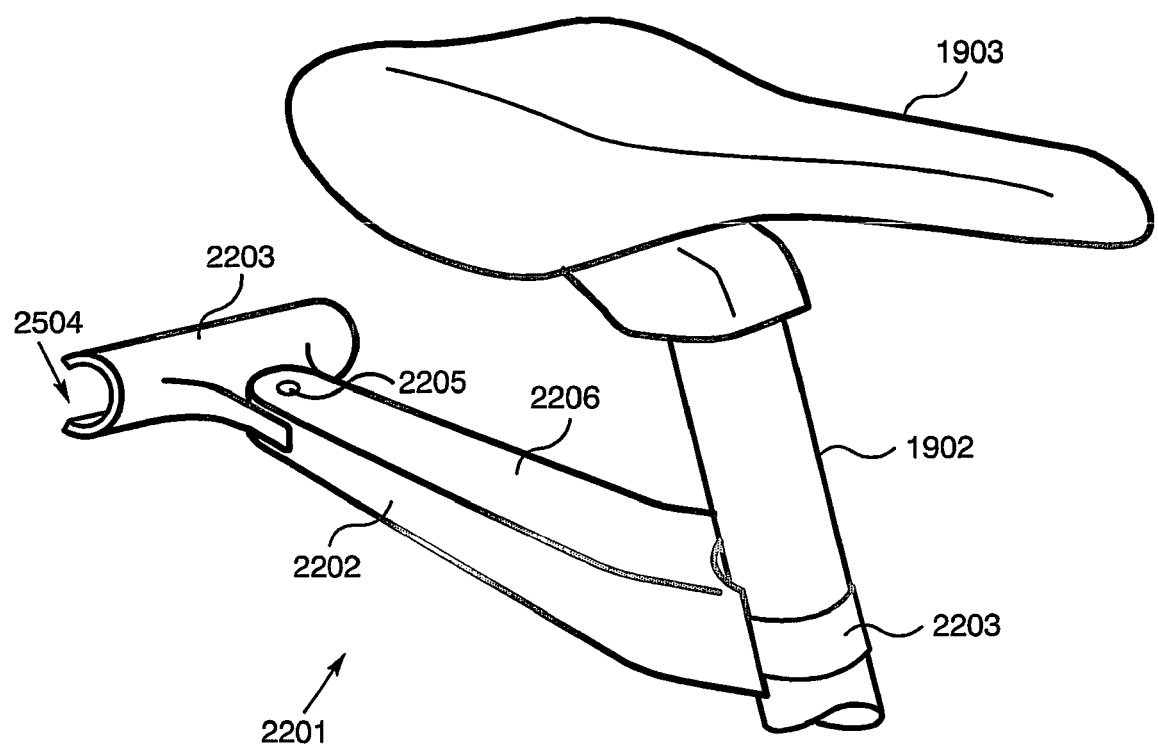
FIG. 22 schematically illustrates a further preferred embodiment of an attachment assembly configured for attaching a pump to a given vehicle whereby the pump is thereby configured to provide a warning signal to traffic that is passing by the vehicle to which the pump is attached.

FIG. 22 schematically illustrates a preferred embodiment of an attachment assembly configured for attaching a pump that is optimised as regards mounting and dismounting. The attachment assembly is generally indicated at 2201 and is shown as attached to a seat pillar 1902 holding saddle 1903. Attachment means assembly 2201 comprises an elongate member 2202 configured to create a distance such that a vehicle warning device held by the assembly is held substantially behind the vehicle seat 1903. The attachment assembly is configured to be attached to seat pillar 1902 via a seat pillar attachment means which, as described in relation to the earlier attachment embodiments, may simply comprise a strap tightened by way of a screw. Elongate member 2202 differs from elongate member 1905 described in relation to FIG. 19 in that it comprises an orifice at the non-seat pillar end, said orifice being configured to enable a pivoting mechanism to be realised. Attached to the pivoting mechanism is a pump attachment member 2203 which is configured to hold a pump attached thereto. The portion of member 2203 that is configured to hold a given pump to which it is attached is configured in a substantially similar manner to that described in relation to FIG. 19 in that it comprises a semi-circular shape that is configured to be placed around and grip a pump that is placed in the semi-circular gripping portion as is generally indicated at 2204. Holding and gripping member 2203 is configured to pivot about the end of elongate member 2202 via pivot or swivel joint 2205. The member 2203 is configured to rotate about pivot 2205 in a plane that is substantially defined by the upper surface 2206 of member 2205. Thus in normal operation, when the vehicle is being ridden along substantially horizontal terrain, member 2203 is configured to pivot in a substantially horizontal plane. In the preferred embodiment the pivot arrangement 2205 is configured to allow only certain predefined relative positions in terms of the angle of an outer edge of member 2203 as compared with the longitudinal length of elongate extension member 2202. A suitable system for allowing only predetermined positions of member 2203 in relation to member 2202 is an angular indexing system of the type well-known to those skilled in the art. The purpose of allowing a multi-position angular setting of member 2203 in relation to member 2202 is so as to permit an operating position wherein the longitudinal axis of the pump is transverse (preferably substantially perpendicular) to the plane of the frame of the vehicle and a second position wherein the pump, whilst still attached to member 2203, is enabled to be stored under saddle 1903. The dimension of bracket 2201 are similar to those of bracket 1901. The distance of the pivot from the outer edge of cross member 2203 is suitably about 30–40 mm.

Although a horizontal pivot is preferred the inventor has found that a veritical pivot also aids in mounting and dismounting. Thus a bracket provided with a pivot to enable the pump to be swung into a position such that it is held parallel to the vehicle frame (for example, vertically upwards behind the riders back) is another possibility. The pivot type brackets described provide convenience as regards mounting and dismounting and additionally enable the pump to be swung in and out of use whilst the rider is riding the vehicle. However the horizontal pivoting mechanism described in relation to FIG. 22 is preferred since it provides the additional benefit of acting as an impact absorber in the event that the pump collides with an object whilst the riders vehicle is in motion. In other words if the pump collides with an object it can swing away from the object.

Figure 23B:
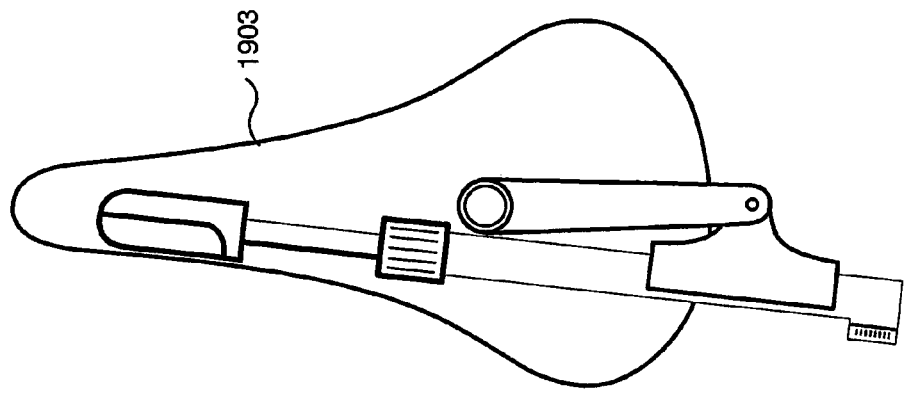
FIGS. 23a and 23b respectively illustrate operational positions, in reverse plan view, of the attachment assembly schematically illustrated in FIG. 22 when in use with a pump.
Figure 23A:
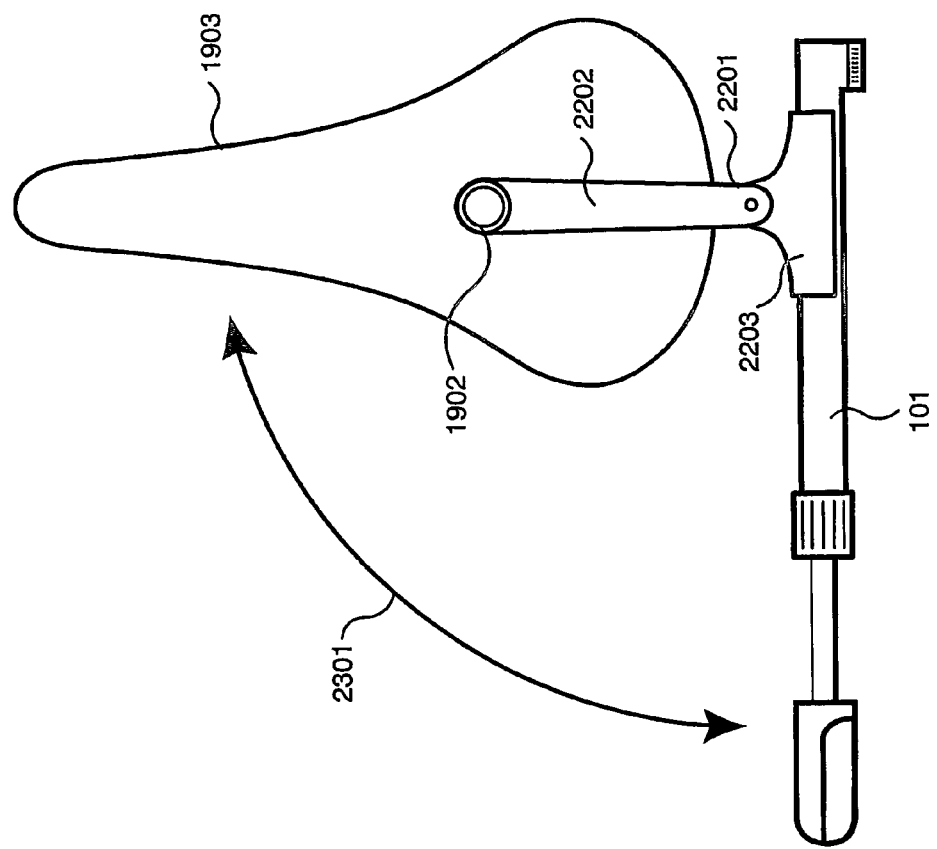

FIGS. 23a and 23b respectively illustrate operational positions of the attachment assembly schematically illustrated in FIG. 22 when in use with a pump. FIGS. 23a and 23b are plan views of the seat 1903 and vehicle warning signal assembly when viewed from the underside of the saddle. When the saddle is attached to a seat pillar which is in turn attached to a vehicle and the vehicle is placed in its normal operating position on the ground then the view shown in FIGS. 23a and 23b is a view in the vertically upwards direction. In FIG. 23a the distance warning device 101 is shown attached to attachment assembly 2201 which in turn is attached to seat pillar 1902. The position of the pump in relation to the seat/seat pillar arrangement as schematically illustrated in FIG. 23a represents the position when the pump is used as a safety warning signal device. Double headed arrow 2301 is included to illustrate the fact that the pump may be turned through substantially 90° from its operational position to a second position wherein the pump is stored under the saddle. The indexed angular rotation system may in fact permit rotation through almost 180°. In the best mode the pump may be swung clockwise or anti-clockwise. FIG. 23b shows pump assembly 101 stored under saddle 1903. In FIG. 23b the pump, in its stored position under saddle 1903, is therefore configured such that a main length of the pump is substantially parallel to the main length of elongate extension member 2202. Furthermore the jaw portion of holding/gripping member 2203 is also, in the stored position substantially parallel to the main length of member 2202. In this way the warning signal device 101 and attachment means assembly 2201 is substantially stored within the confines of saddle 1903, the handle end of the pump assembly being stored under the front portion of saddle 1903.

The attachment means assembly 2201 described in relation to FIGS. 22 to 23b is highly advantageous over the previously described embodiments in that it enables the pump, when in use to be easily placed in to a non-warning signal use position by an operator of a vehicle simply grasping the handle end of the pump and swinging the pump through approximately 90° so that the pump handle ends up in a position under saddle 1903. The reason that this is useful is that without first moving the pump to the stored position under the saddle a cyclist would have to take care in getting off his or her vehicle so that they did not knock the warning signal device 101 off of attachment assembly 2201. In other words the pump assembly can be placed under the saddle prior to a given operator of the vehicle dismounting from the vehicle.

The swivel joint mechanism is preferably configured to enable the member 2203 to rotate either in a clockwise direction or an anticlockwise direction. In this way the pump may be swung under the saddle either from the left or from the right hand side of a given vehicle to which it is attached for use via a bracket as a vehicle safety warning signal device.

Figure 24A:
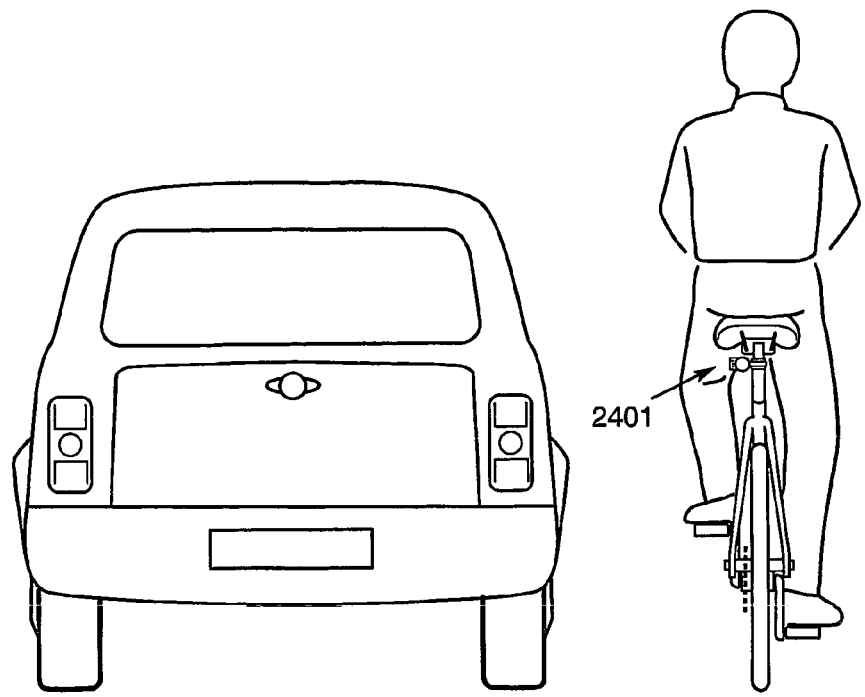
FIGS. 24a and 24b respectively schematically illustrate the environment in which the bracket detailed in FIGS. 22, 23a and 23b is used, the Figures further showing the bracket in use in traffic in either of the operational positions described in relation to FIGS. 23a and 23b.
Figure 24B:
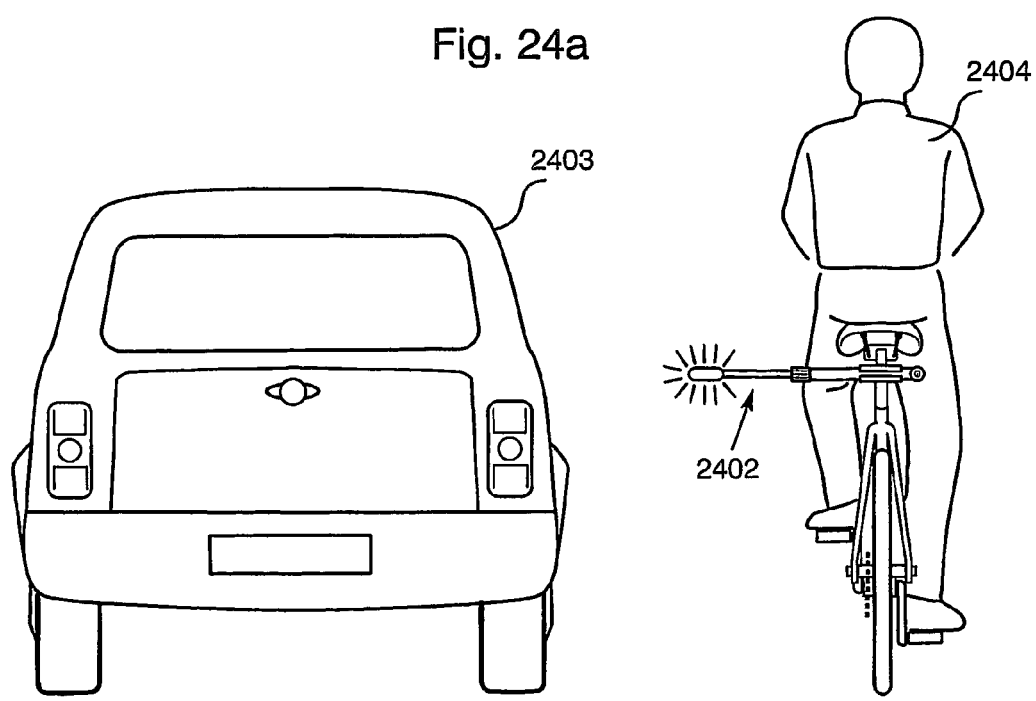

FIGS. 24a and 24b respectively further schematically illustrate the environment in which the attachment means assembly of FIGS. 22 and 23 is used. In FIG. 24a the vehicle warning signal device held on bracket arrangement 2201 is shown as stored in the position as described in relation to FIG. 23b. Thus the main length of the pump is stored under and along the longitudinal axis of the saddle and therefore in this position the longitudinal axis of the pump is substantially parallel to the main plane through the frame of the vehicle.

FIG. 24b schematically illustrates the pump assembly/attachment assembly of FIGS. 22 and 23 in use in the operational position of FIG. 23a. Thus at 2402 the piston rod of the vehicle safety warning device is fully extended and comprises a light or other high visibility element located in the handle portion of the pump. In this manner vehicle 2403 is deterred from coming too close to cyclist 2404 during the event of it overtaking cyclist 2404. In accordance with the invention the safety of the cyclist is therefore improved in that the cyclist is less likely to be startled or injured by a passing vehicle. The invention clearly provides enhanced safety in relation to oncoming traffic and traffic passing from behind and provides advantages in relation to the safety of cyclists and riders of other like vehicles in a wide variety of road-based situations that they may experience.

Figures 25A, 25B:
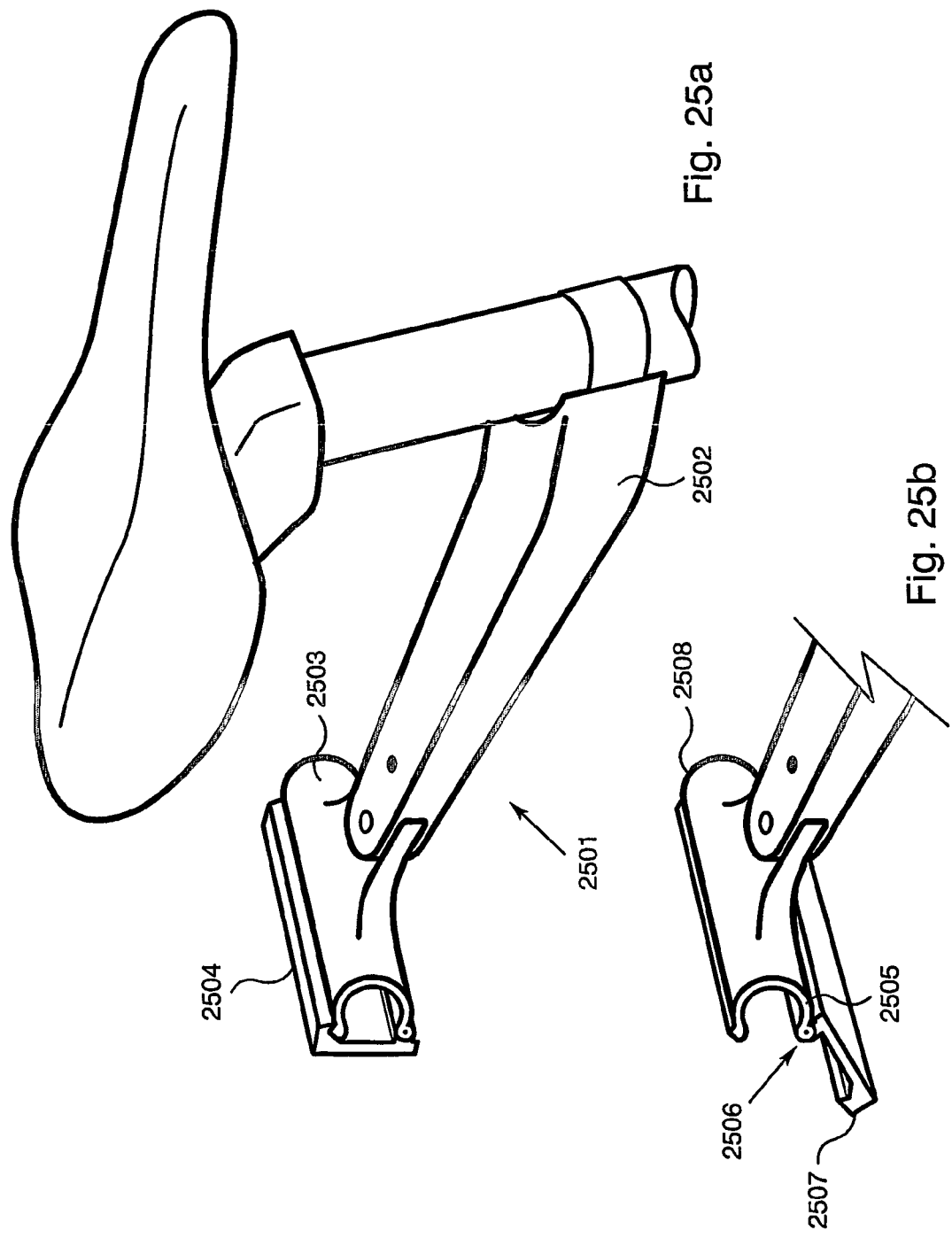
FIGS. 25a and 25b schematically illustrate a swivel bracket mechanism of the type illustrated in FIGS. 22, 23a and 23b wherein the bracket is fitted with a holding gate.

FIGS. 25a and 25b schematically illustrate in perspective view a further preferred embodiment of an attachment arrangement for holding a pump as configured in accordance with the present invention. Attachment arrangement 2501 comprises substantially the same structural members as the attachment arrangement illustrated in FIG. 22 and includes an elongate extension member 2502 and a cross-member 2503 located towards the opposite end to the seat pillar attachment end of the member. However unlike the embodiment shown in FIG. 22, cross-member 2503 comprises a locking device 2504 in the form of a gate to thereby lock a pump attached to cross-member 2503 into place. Locking gate 2504 is further detailed in FIG. 25b wherein it is seen that the locking gate pivots from lower jaw member 2505 about pivot 2506. A pivotal pin 2506 extends along the length of member 2503 to form a hinge-like arrangement as regards the mechanical relationship between the gate and member 2503. Thus locking gate 2504 pivots about member 2503 substantially along one of its edges, the other opposite edge 2507 being configured to lock onto the outer extremity of the upper edge jaw member 2508 of cross-member 2503. Upper jaw 2508 comprises a lip arrangement for interacting with an oppositely configured lip arrangement on edge 2507 of gate 2504. In this way the non-pivoted edges of gate member 2504 and cross-member 2503 are configured to clip together in a snap-fit type action with the pump placed within the jaw members 2505 and 2508 of cross-member 2503. The advantage of having a locking gate of the type described is that it enables the pump to be firmly attached to the vehicle so that the pump is less likely to detach from the vehicle in the event that it is knocked or otherwise disturbed in some way. A swivel type bracket used with a locking gate provides a full impact absorption system in that the locking gate ensures that the pump remains attached to the bracket in the event that it experiences a collision. The outer face of the locking gate may be configured with a reflective material to further enhance the reflective characteristics of the pump when in use in its mode as a visual warning signal.

Various embodiments of a vehicle safety light device as configured in accordance with the present invention have been described. In the preferred embodiment, the pump comprises at least one visual warning light that is an integral part of the pump. A further embodiment envisaged comprises a visual warning light that is configured on a bracket type arrangement, wherein the bracket arrangement is configured to attach to the pump thereby providing a visual warning device and bracket assembly that provides a visual warning light device attached to the external surface of the pump. Thus a vehicle safety light device configured in accordance with the present invention may comprise one or more warning lights located inside the body of the pump and/or one or more warning lights located externally of the body of the pump. One or more reflective or other high visibility warning elements may also be comprised as part of the vehicle safety warning signal device. Those skilled in the art will realise that aspects of the present invention are not to be construed as limited to a pump having a visual warning signal. This is because the pump attachment assembly may be used to hold a pump that has not been modified in accordance with the present invention i.e. a pump that does not comprise a lock and/or especially configured high visibility element. Thus using a known pump with a bracket as configured in accordance with the present invention provides a cyclist or a rider of a like vehicle with a system that improves upon their personal safety when a given vehicle is being operated by them.

Those skilled in the art will realise that the invention provides many advantages over known vehicle warning light devices. In particular, it is known that cyclists prefer functional ergonomic components in that they are then more likely to maximise use of such accessories when riding a cycle. In general, cyclists may thus be considered to exhibit a degree of vanity when it comes to using devices on their vehicles. Many existing visual warning light devices, and in particular those used on cycles, suffer from the fact that they are cumbersome and do not add to the elegance of the cyclists vehicle. The present invention helps to overcome this problem by using a component (a pump) that is normally present on such vehicles with an elegant second use. In this way the cyclist is not restricted to permanently using the device, but instead may use the invention as and when it is felt necessary. A vehicle safety light device as configured in accordance with the present invention is readily stored or readily placed into one or more operational positions, as desired, by a vehicle rider.

The invention claimed is:

1. A vehicle safety light device for use on a bicycle, motorcycle or like vehicle each having a main frame with a longitudinally extending axis and a main plane containing said axis, said device characterized by comprising:
   an elongate air pump having a main length extending in a plane perpendicular to the main plane of a bicycle, motorcycle, or a like vehicle, wherein said pump comprises at least one electrically powered visual warning light, said pump thereby being configured, following releasable attachment to an operational position on a said vehicle, to provide a visual warning signal perpendicular to said main length.

2. The device according to claim 1, wherein said pump comprises a telescopic hand pump of the type comprising an elongate air compression chamber and an elongate piston-handle arrangement for effecting pumping.

3. The device according to claim 2, wherein said pump comprises a locking means configured to releasably lock said handle of said pump in a fixed position relative to said air compression chamber.

4. The device according to claim 1, wherein said at least one light is configured to produce a light beam in a direction that is transverse to said main length of said pump.

5. The device according to claim 1, wherein said at least one light is configured to produce a light beam in a direction that is perpendicular to said main length of said pump.

6. The device according claim 1, wherein said at least one electrically powered visual warning light is powered by one or more batteries.

7. The device as claimed in claim 1, wherein said at least one light is configured for use in providing a said visual warning signal at the back of said vehicle, said light being red in color.

8. The device as claimed in claim 1, wherein said at least one light comprises an arrangement configured to emit white light in a first direction and red light in the diametrically opposite direction.

9. A vehicle safety light device for use on a bicycle, motorcycle or like vehicle, said device characterized by comprising:
   an elongate air pump having a main length, wherein said pump comprises at least one electrically powered visual warning light, said pump thereby being configured, following releasable attachment to an operational position on a said vehicle, to provide a visual warning signal,
   wherein said pump comprises a telescopic hand pump of the type comprising an elongate air compression chamber and an elongate piston-handle arrangement for effecting pumping,
   wherein said at least one electrically powered light is comprised as a part of said handle.

10. A vehicle safety light device for use on a bicycle, motorcycle or like vehicle, said device characterized by comprising:
    an elongate air pump having a main length, wherein said pump comprises at least one electrically powered visual warning light, said pump thereby being configured, following releasable attachment to an operational position on a said vehicle, to provide a visual warning signal,
    wherein said pump comprises a telescopic hand pump of the type comprising an elongate air compression chamber and an elongate piston-handle arrangement for effecting pumping,
    wherein a first and a second visual warning light are provided, said first visual warning light being comprised as part of said handle and said second visual warning light being comprised as part of said compression chamber portion of said pump.

11. A vehicle safety light device for use on a bicycle, motorcycle or like vehicle, said device characterized by comprising:
    an elongate air pump having a main length, wherein said pump comprises at least one electrically cowered visual warning light, said pump thereby being configured, following releasable attachment to an operational position on a said vehicle, to provide a visual warning signal,
    wherein said pump comprises a telescopic hand pump of the type comprising an elongate air compression chamber and an elongate piston-handle arrangement for effecting pumping,
    wherein said piston shaft comprises lighting means to illuminate said shalt.

12. A vehicle safety light device for use on a bicycle, motorcycle or like vehicle, said device characterized by comprising:
    an elongate air pump having a main length, wherein said pump comprises at least one electrically powered visual warning light said pump thereby being configured, following releasable attachment to an operational position on a said vehicle, to provide a visual warning signal,
    wherein said pump comprises a telescopic hand pump of the type comprising an elongate air compression chamber and an elongate piston-handle arrangement for effecting pumping,
    wherein said handle is detachable from the remainder of said pump, said handle comprising at least one visual warning light.

13. A vehicle safety warning signal system for use on a bicycle, motorcycle, or like vehicle each having a main frame with a longitudinally extending axis and a main plane containing said axis said system characterized in that it comprises:
    an elongate air pump having a main length extending perpendicular to said main plane, wherein said pump is provided to function as a visual warning device; and an attachment assembly configured to releasably attach said pump to a vehicle for operation in providing a visual warning signal, wherein said attachment assembly, when is use with said pump on said vehicle, is configured to hold said pump in at least a first position such that said main length of said pump is transverse to the main plane of the frame of said vehicle.

14. The system as claimed in claim 13, wherein said pump comprises a telescopic hand pump of the type comprising an elongate air compression chamber and an elongate piston-handle arrangement for effecting pumping.

15. The system as claimed in claim 13, wherein said pump comprises at least one visual warning device element selected from the set comprising, an electrically powered light and a reflector unit.

16. The system as claimed in claim 13, wherein said pump comprises a visual warning light arrangement configured to provide a first light signal in a first direction and a second light signal in a diametrically opposite direction.

17. The system as claimed in claim 13, wherein said attachment assembly comprises means for detachably holding said pump at a distance from said seat pillar and means for attaching said attachment assembly to a vehicle seat pillar.

18. A vehicle safely warning signal system for use on a bicycle, motorcycle, or like vehicle each having a main frame with a main plane, said system characterized in that it comprises:

an elongate air pump having a main length, wherein said pump is provided to function as a visual warning device; and an attachment assembly configured to releasably attach said pump to a vehicle for operation in providing a visual warning signal, wherein said attachment assembly, when is use with said pump on said vehicle, is configured to hold said pump in at least a first position such that said main length of said pump is transverse to the main plane of the frame of said vehicle, wherein said pump comprises at least one visual warning device element selected from the set comprising, an electrically powered light and a reflector unit, wherein said at least one visual warning device element is located in said handle.

19. A vehicle safety light device for use on a bicycle, motorcycle or like vehicle, said device characterized by comprising:

an elongate air pump having a main length, wherein said pump comprises at least one electrically powered visual warning light, said pump thereby being configured, following releasable attachment to an operational position on a said vehicle, to provide a visual warning signal and wherein, wherein said pump comprises a telescopic hand pump of the type comprising an elongate air compression chamber and an elongate piston-handle arrangement for effecting pumping, wherein said pump comprises a locking means configured to releasably lock said handle of said pump in a fixed position relative to said air compression chamber, wherein said locking means comprises a convex cone locking bush.

20. A vehicle safety warning signal system for use on a bicycle, motorcycle, or like vehicle each having a main frame with a main plane, said system characterized in that it comprises:

an elongate air pump having a main length, wherein said pump is provided to function as a visual warning device; and an attachment assembly configured to releasably attach said pump to a vehicle for operation in providing a visual warning signal, wherein said attachment assembly, when is use with said pump on said vehicle, is configured to hold said pump in at least a first position such that said main length of said pump is transverse to the main plane of the frame of said vehicle, wherein said attachment assembly comprises a pivot to enable said pump to be rotated in a plane from its in use position to a storage position.

21. An attachment assembly characterized in that said assembly is configured to attach a vehicle safety warning device of the type comprising an elongate air pump having a main longitudinal length to a bicycle, motorcycle or like vehicle each having a frame with a main plane, said attachment arrangement comprising:

first attachment means for substantially permanently affixing said attachment arrangement to said vehicle or to an object attached to said vehicle; and second attachment means for allowing detachable attachment of said pump to said attachment assembly, said attachment assembly being configured to hold said pump in at least a first position such that said longitudinal length of said pump is transverse to a main plane of a frame of said vehicle.

22. The attachment assembly as claimed in claim 21, wherein said first attachment means is configured to fix said attachment arrangement to a seat pillar of a said vehicle.

23. The attachment assembly as claimed in claim 21, wherein said assembly is formed as an integral part of a seat of a said vehicle, said first and said second attachment means thereby comprising an integrally formed part of said seat.

24. A vehicle fitted with an attachment arrangement as claimed in claim 21.

25. An attachment assembly characterized in that said assembly is configured to attach a vehicle safety warning device of the type comprising an elongate air pump having a main longitudinal length to a bicycle, motorcycle or like vehicle each having a frame with a main plane, said attachment arrangement comprising:

first attachment means for substantially permanently affixing said attachment arrangement to said vehicle or to an object attached to said vehicle; and second attachment means for allowing detachable attachment of said pump to said attachment assembly, said attachment assembly being configured to hold said pump in at least a first position such that said longitudinal length of said pump is transverse to a main plane of a frame of said vehicle, wherein said first attachment means is located towards a first end of a first elongate member, said first elongate member being coupled at a second end to a second elongate member, said second elongate member being substantially perpendicular in orientation relative to said first elongate member.

26. An attachment assembly characterized in that said assembly is configured to attach a vehicle safety warning device of the type comprising an elongate air pump having a main longitudinal length to a bicycle, motorcycle or like vehicle each having a frame with a main plane, said attachment arrangement comprising:

first attachment means for substantially permanently affixing said attachment arrangement to said vehicle or to an object attached to said vehicle; and second attachment means for allowing detachable attachment of said pump to said attachment assembly, said attachment assembly being configured to hold said pump in at least a first position such that said longitudinal length of said pump is transverse to a main plane of a frame of said vehicle, wherein said first attachment means is coupled to said second attachment means via a pivot, said pivot thereby enabling said second attachment means to pivot about said first attachment means.

27. The attachment assembly as claimed in claim 26 wherein when said assembly is attached to a said vehicle said second attachment means rotates in a plane that is transverse to the main plane of the frame of the vehicle.

28. The attachment assembly as claimed in claim 26, wherein when said assembly is attached to a said vehicle said second attachment means rotates in a plane that is substantially perpendicular to the main plane of the frame of the vehicle.

29. A vehicle safety light device for use on a bicycle, motorcycle or like vehicle, said device characterized by comprising:

an elongate air pump having a main length, wherein said pump comprises at least one electrically powered visual warning light, said pump thereby being configured, following releasable attachment to an operational position on a said vehicle, to provide a visual warning signal, wherein said pump comprises a telescopic hand pump of the type comprising an elongate air compression chamber and an elongate piston-handle arrangement for effecting pumping, and wherein said pump comprises a locking means configured to releasably lock said handle of said pump in a fixed position relative to said air compression chamber, and wherein said locking means is configured to substantially prevent at least translational movement of said piston arrangement relative to said compression chamber when said device is configured for use as a vehicle safety warning signal device with said piston arrangement in an extended position from said compression chamber.

30. The device according to claim 29, wherein said prevented movement additionally comprises prevention of rotational movement of said piston arrangement relative to said compression chamber.

31. A vehicle safety light device for use on a bicycle, motorcycle or like vehicle, said device characterized by comprising:

an elongate air pump having a main length, wherein said pump comprises at least one electrically powered visual warning light, said pump thereby being configured, following releasable attachment to an operational position on a said vehicle, to provide a visual warning signal, wherein said pump comprises a telescopic hand pump of the type comprising an elongate air compression chamber and an elongate piston-handle arrangement for effecting pumping, and wherein said pump comprises a locking means configured to releasably lock said handle of said pump in a fixed position relative to said air compression chamber, and wherein said locking mechanism enables said piston arrangement to be locked in a plurality of extended positions from said compression chamber.

32. The device of claim 31 wherein the device is attached to a vehicle.

* * * * *